United States Patent
Xia et al.

(10) Patent No.: US 8,308,375 B2
(45) Date of Patent: Nov. 13, 2012

(54) OPTICAL SIGNAL MEASUREMENT DEVICES

(75) Inventors: Tiejun J. Xia, Richardson, TX (US); Glenn A. Wellbrock, Wylie, TX (US); Nee-Ben Gee, Needham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 12/917,757

(22) Filed: Nov. 2, 2010

(65) Prior Publication Data

US 2011/0043793 A1 Feb. 24, 2011

Related U.S. Application Data

(63) Continuation-in-part of application No. 11/612,218, filed on Dec. 18, 2006, now Pat. No. 7,955,002.

(51) Int. Cl.
  G02B 6/36 (2006.01)
  G02B 6/12 (2006.01)
(52) U.S. Cl. ............................................. 385/89; 385/14
(58) Field of Classification Search .................... 385/89, 385/14
  See application file for complete search history.

(56) References Cited

U.S. PATENT DOCUMENTS

| | | | |
|---|---|---|---|
| 3,803,407 A * | 4/1974 | Anderson ................ 250/214 VT |
| 4,332,469 A * | 6/1982 | Wendland ..................... 356/222 |
| 4,576,436 A * | 3/1986 | Daniel ............................ 385/25 |
| 4,761,685 A * | 8/1988 | Asaida et al. ................. 348/188 |
| 4,854,667 A * | 8/1989 | Ebata et al. ................... 385/134 |
| 4,884,809 A * | 12/1989 | Rowan ......................... 463/47.3 |
| 4,893,815 A * | 1/1990 | Rowan ......................... 463/47.3 |
| 4,927,266 A * | 5/1990 | Sugiura et al. ............. 356/243.1 |
| 5,202,812 A * | 4/1993 | Shinoda et al. .................. 361/65 |
| 5,263,951 A * | 11/1993 | Spears et al. .................... 606/12 |
| 5,455,672 A * | 10/1995 | Lamonde et al. ............. 356/73.1 |
| 5,521,701 A * | 5/1996 | Felger et al. .................. 356/218 |
| 5,570,176 A * | 10/1996 | Noel ............................ 356/73.1 |
| 5,572,438 A * | 11/1996 | Ehlers et al. .................. 700/295 |
| 5,583,764 A * | 12/1996 | Nail et al. ......................... 702/2 |
| 5,591,964 A * | 1/1997 | Poole ....................... 250/227.14 |
| 5,592,284 A * | 1/1997 | Bedard ........................ 356/73.1 |
| 5,671,048 A * | 9/1997 | Lacey ........................... 356/507 |
| 5,708,265 A * | 1/1998 | Poole ....................... 250/227.14 |
| 5,745,624 A * | 4/1998 | Chan et al. ...................... 385/91 |
| 5,751,418 A * | 5/1998 | Kimura et al. ................ 356/319 |
| 5,825,516 A * | 10/1998 | Walsh ............................. 398/40 |
| 5,838,589 A * | 11/1998 | Nail et al. ..................... 700/286 |
| 6,177,988 B1 * | 1/2001 | Dubnack et al. ............. 356/216 |
| 6,238,076 B1 * | 5/2001 | Pascale et al. ................ 362/558 |
| 6,264,481 B1 * | 7/2001 | Kozel et al. .................... 439/92 |
| 6,304,350 B1 * | 10/2001 | Doerr et al. ..................... 398/9 |
| 6,574,652 B2 * | 6/2003 | Burkhard ......................... 718/1 |
| 6,676,307 B1 * | 1/2004 | Yang et al. ...................... 385/96 |
| 6,826,206 B1 * | 11/2004 | Andersson ...................... 372/20 |
| 7,434,116 B2 * | 10/2008 | Franke et al. ................. 714/704 |

(Continued)

*Primary Examiner* — K. Cyrus Kianni

(57) ABSTRACT

A device includes a female connector to receive a male network connector of a network conduit, and a first male connector optically communicating with the female connector, where the first male connector includes a first indicator that identifies a first wavelength optical signal. The device also includes a second male connector optically communicating with the female connector, where the second male connector includes a second indicator that identifies a second wavelength optical signal. The device further includes a wavelength splitter to receive an optical signal from the network conduit via the female connector, provide the optical signal to the first male connector when the optical signal corresponds to the first wavelength optical signal, and provide the optical signal to the second male connector when the optical signal corresponds to the second wavelength optical signal.

20 Claims, 22 Drawing Sheets

U.S. PATENT DOCUMENTS

| | | | |
|---|---|---|---|
| 7,471,206 B1* | 12/2008 | Ellerman | 340/603 |
| 7,477,285 B1* | 1/2009 | Johnson | 348/143 |
| 7,505,137 B2* | 3/2009 | O'Gorman et al. | 356/454 |
| 7,756,418 B2* | 7/2010 | Ofalt et al. | 398/25 |
| 2001/0021004 A1* | 9/2001 | Yano | 353/31 |
| 2002/0002426 A1* | 1/2002 | Burkhard | 700/286 |
| 2002/0106149 A1* | 8/2002 | Tehrani | 385/27 |
| 2002/0175268 A1* | 11/2002 | Smith | 250/208.1 |
| 2003/0031398 A1* | 2/2003 | Franke et al. | 385/12 |
| 2003/0046025 A1* | 3/2003 | Jamieson et al. | 702/159 |
| 2004/0170369 A1* | 9/2004 | Pons | 385/135 |
| 2005/0069013 A1* | 3/2005 | Bhandarkar et al. | 372/102 |
| 2005/0177027 A1* | 8/2005 | Hirata | 600/179 |
| 2005/0226588 A1* | 10/2005 | Pons | 385/135 |
| 2006/0038980 A1* | 2/2006 | Naka et al. | 356/73 |
| 2006/0177222 A1* | 8/2006 | Beller | 398/38 |
| 2006/0198634 A1* | 9/2006 | Ofalt et al. | 398/16 |
| 2006/0236624 A1* | 10/2006 | Blair | 52/220.1 |
| 2007/0014526 A1* | 1/2007 | Lazo | 385/134 |
| 2007/0025676 A1* | 2/2007 | Russell | 385/134 |
| 2007/0049794 A1* | 3/2007 | Glassenberg et al. | 600/109 |
| 2007/0121110 A1* | 5/2007 | Kralik et al. | 356/318 |
| 2008/0114555 A1* | 5/2008 | Scott | 702/66 |
| 2008/0297773 A1* | 12/2008 | Blair et al. | 356/73.1 |

* cited by examiner

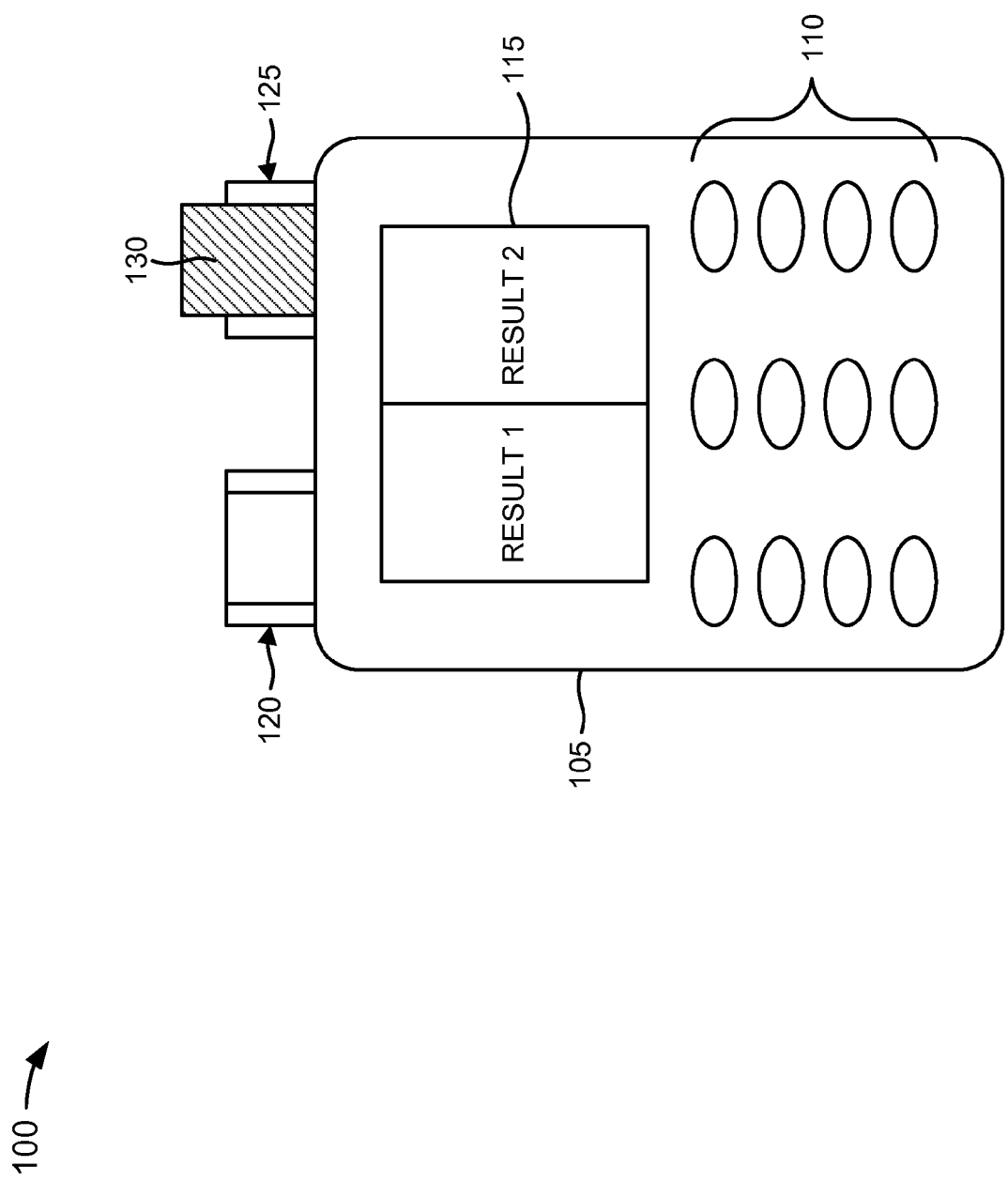

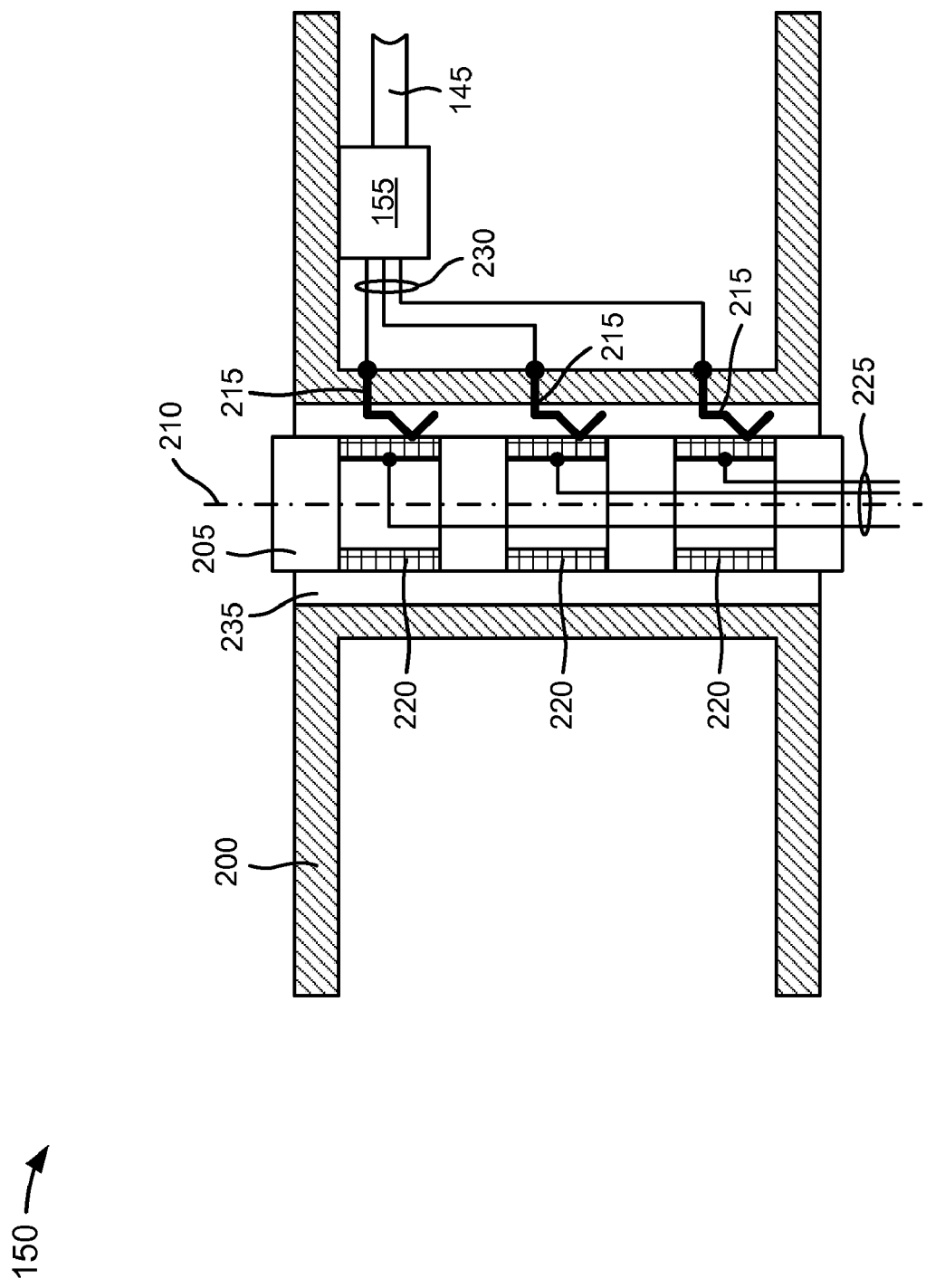

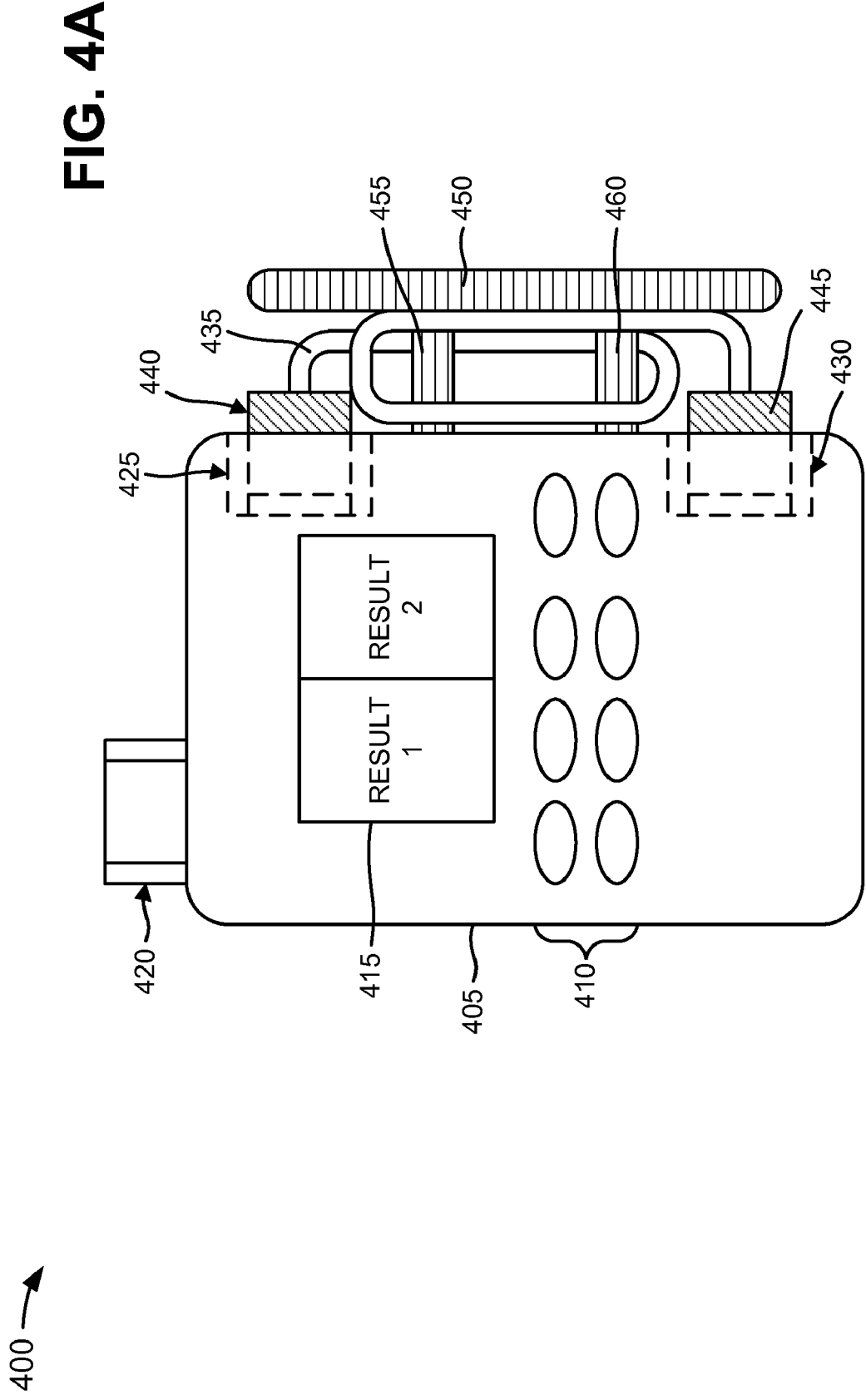

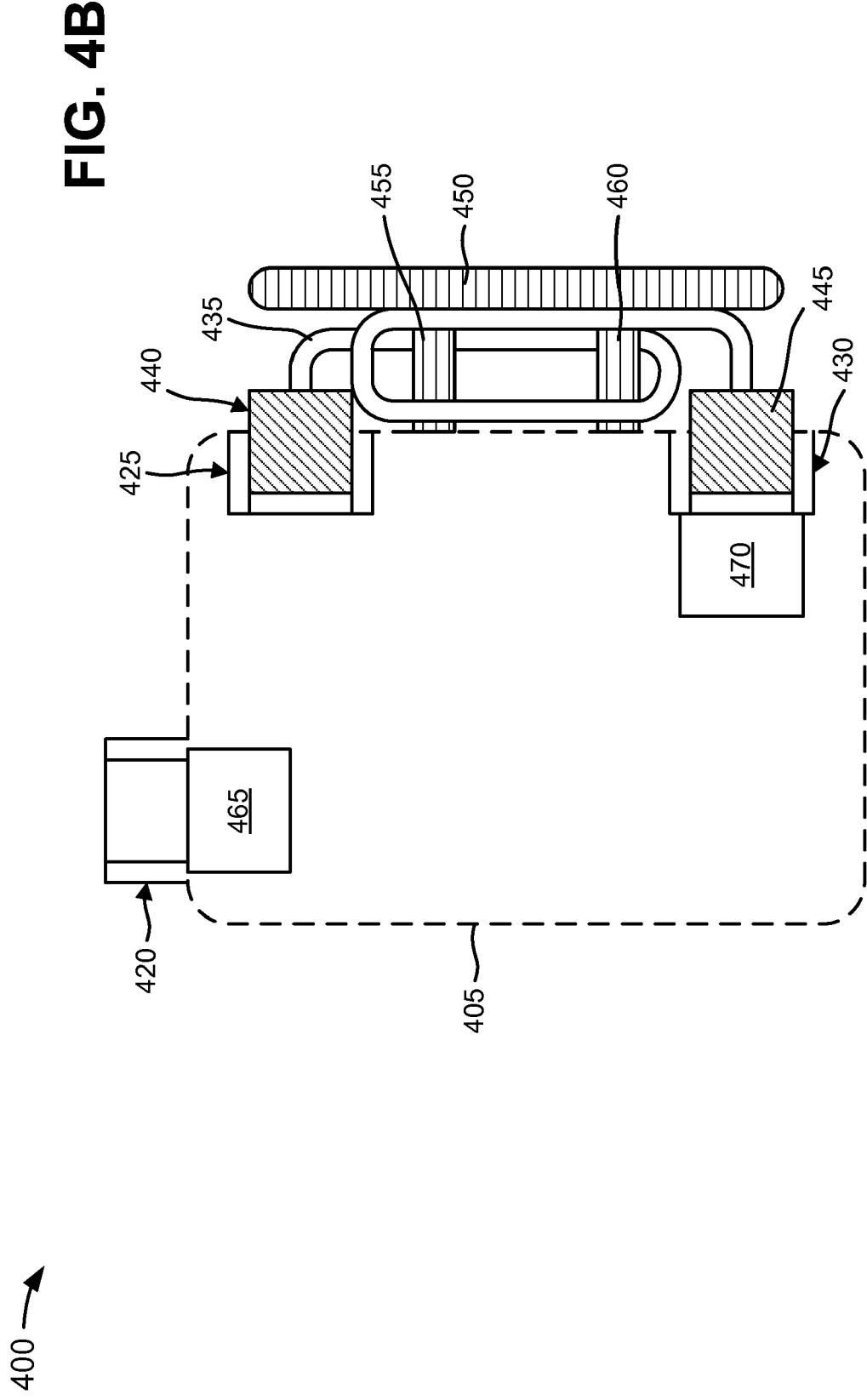

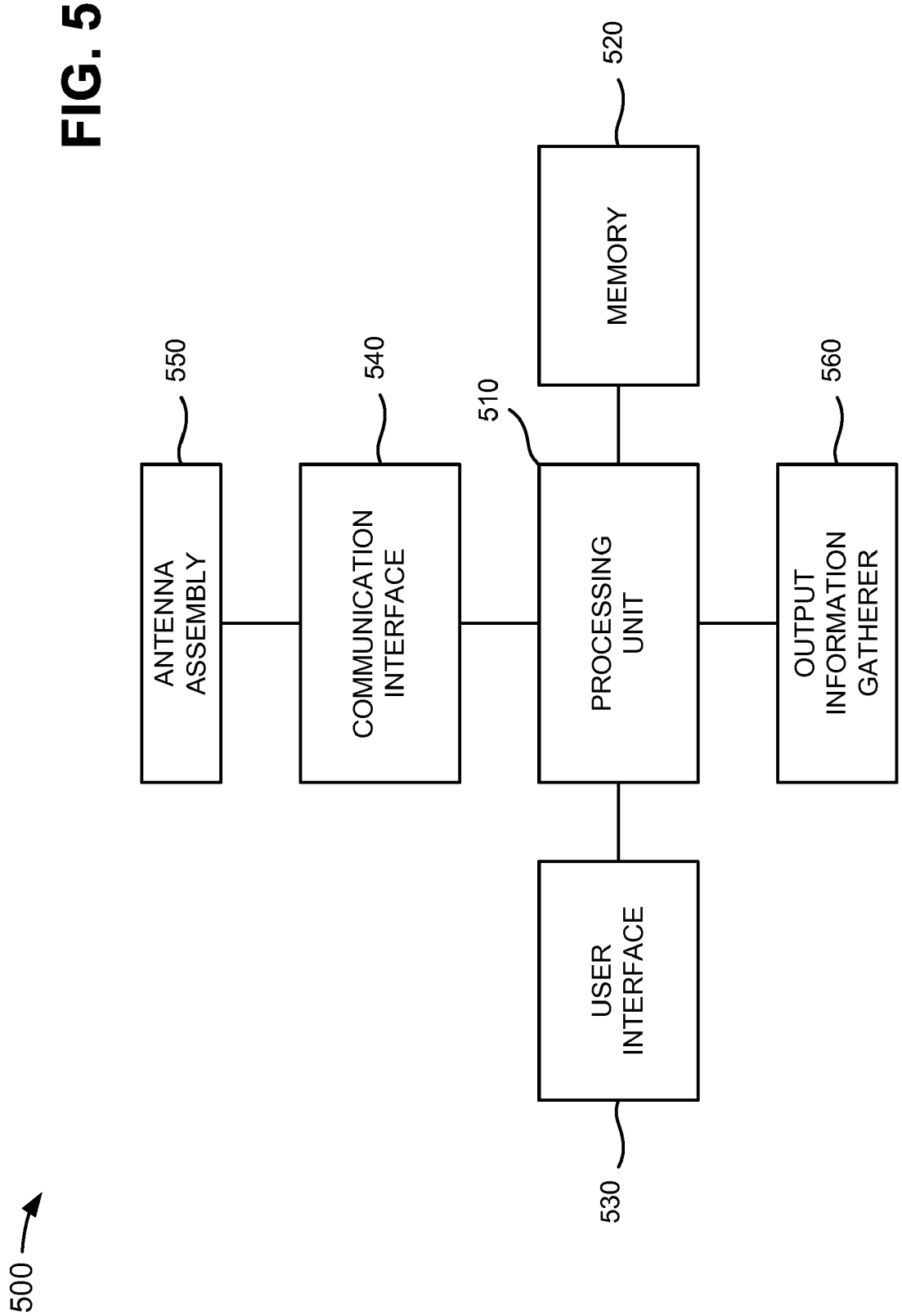

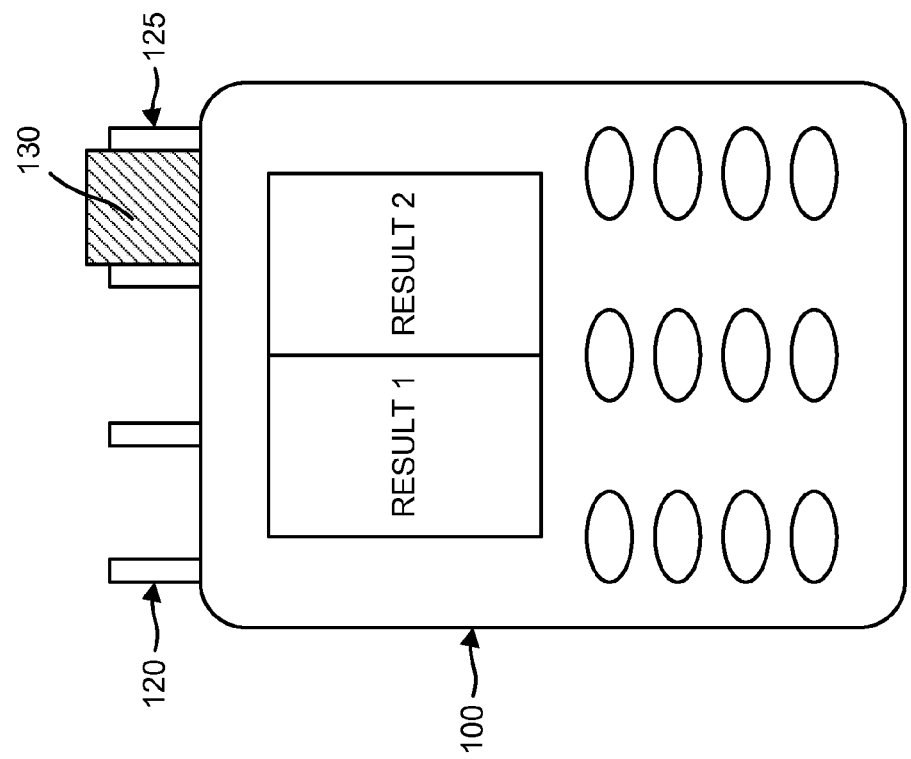
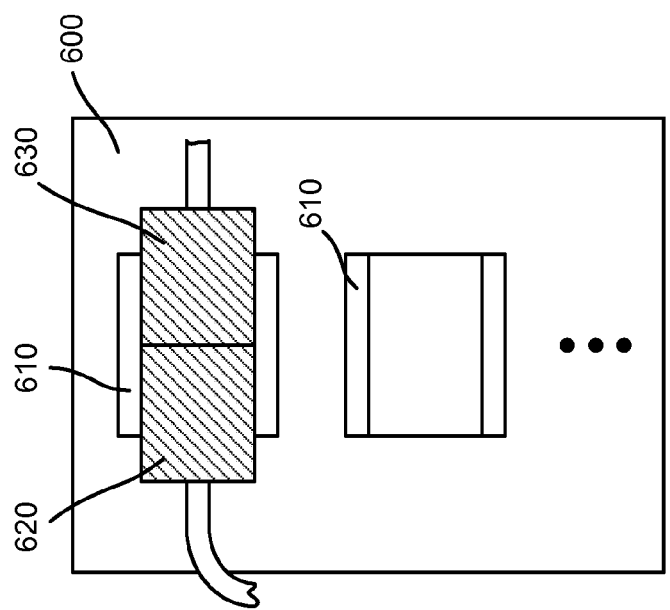
FIG. 6A

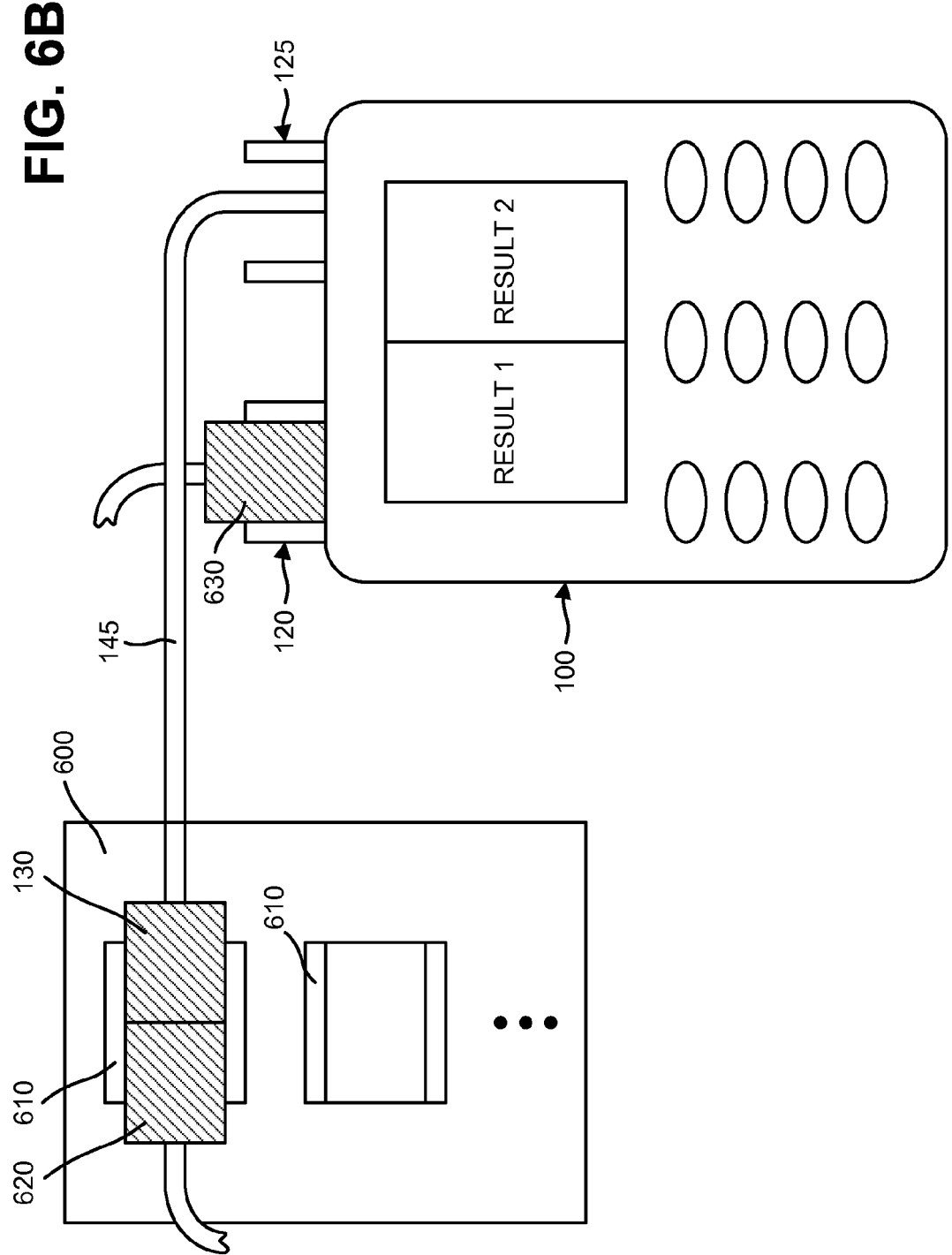

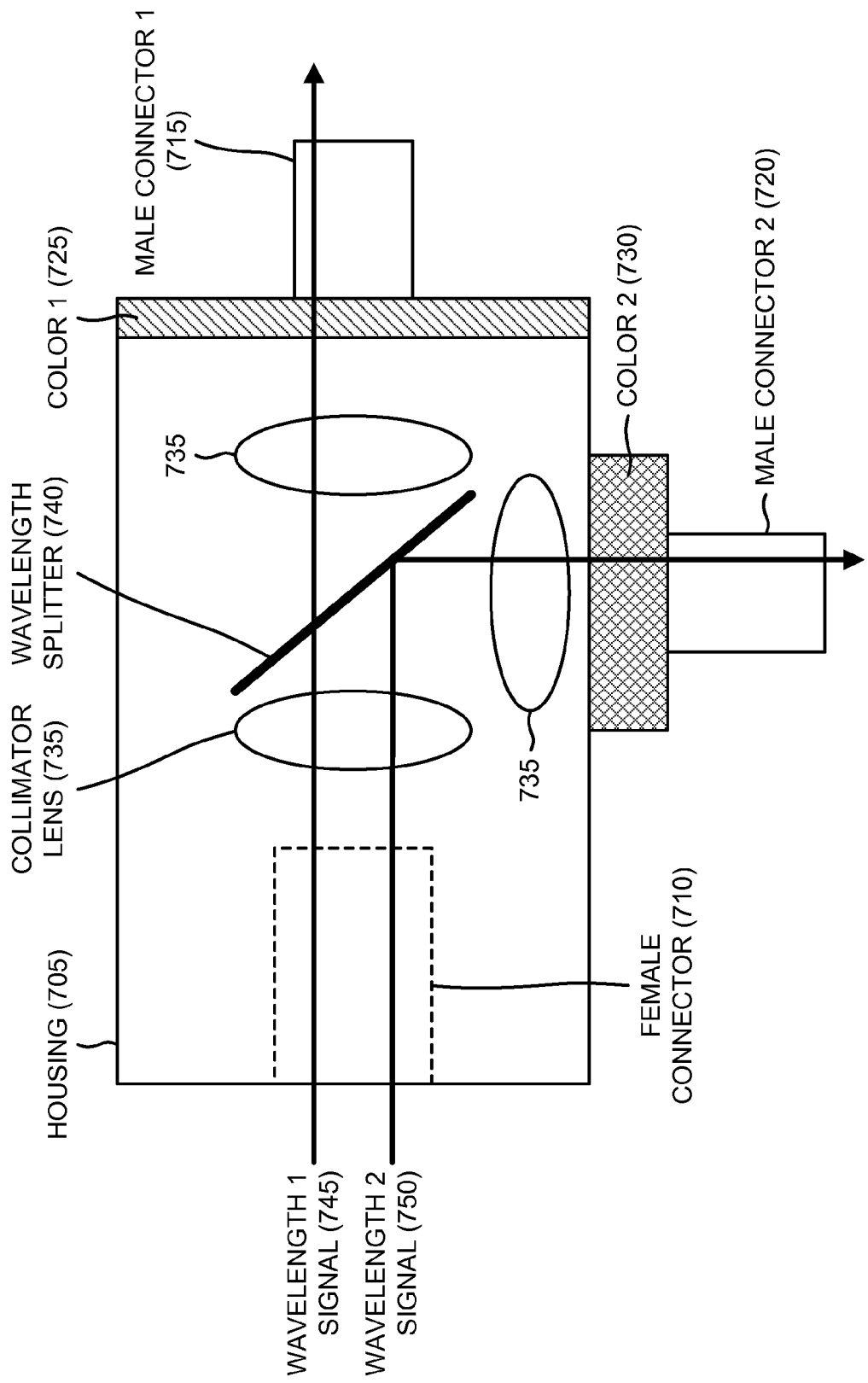

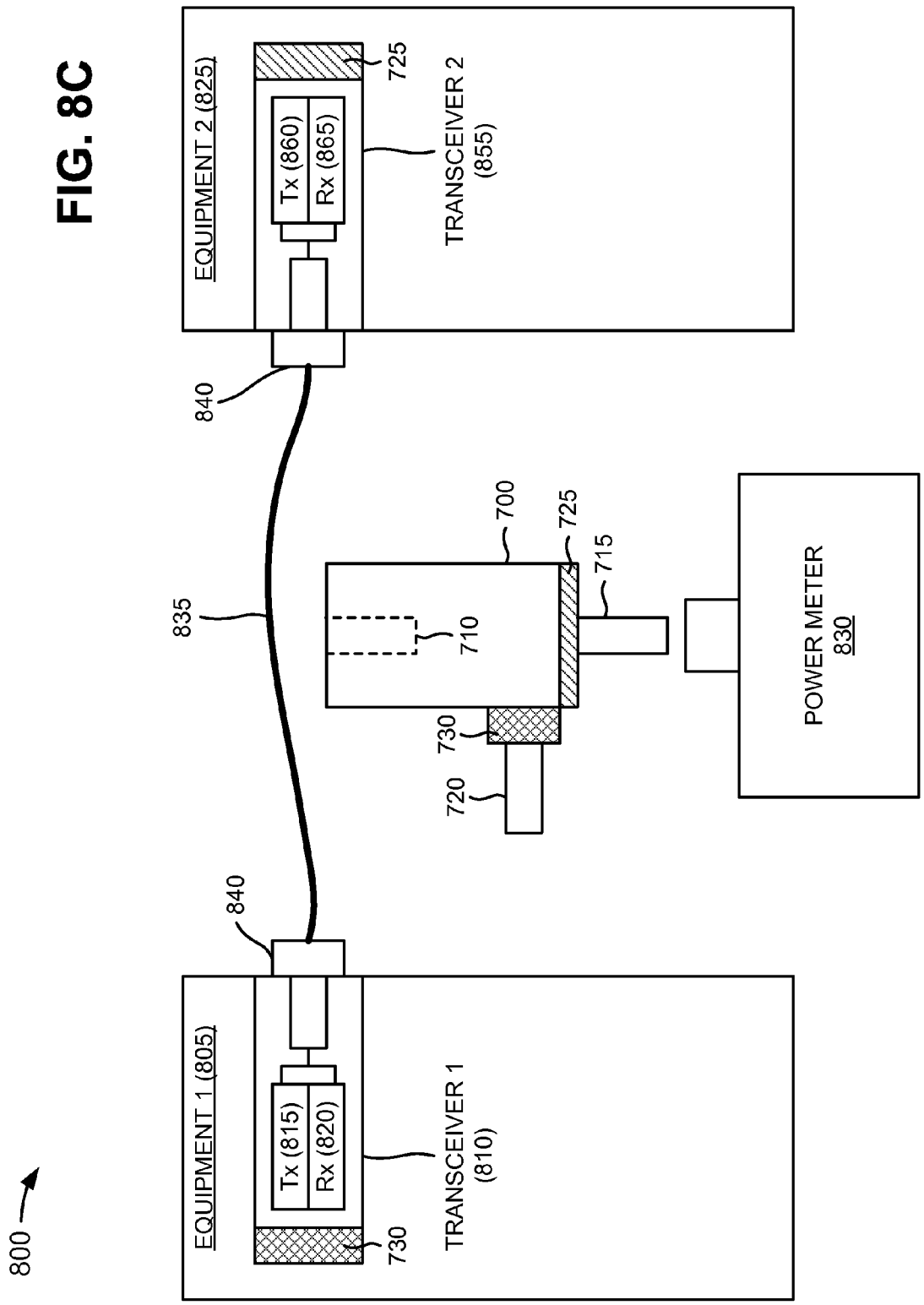

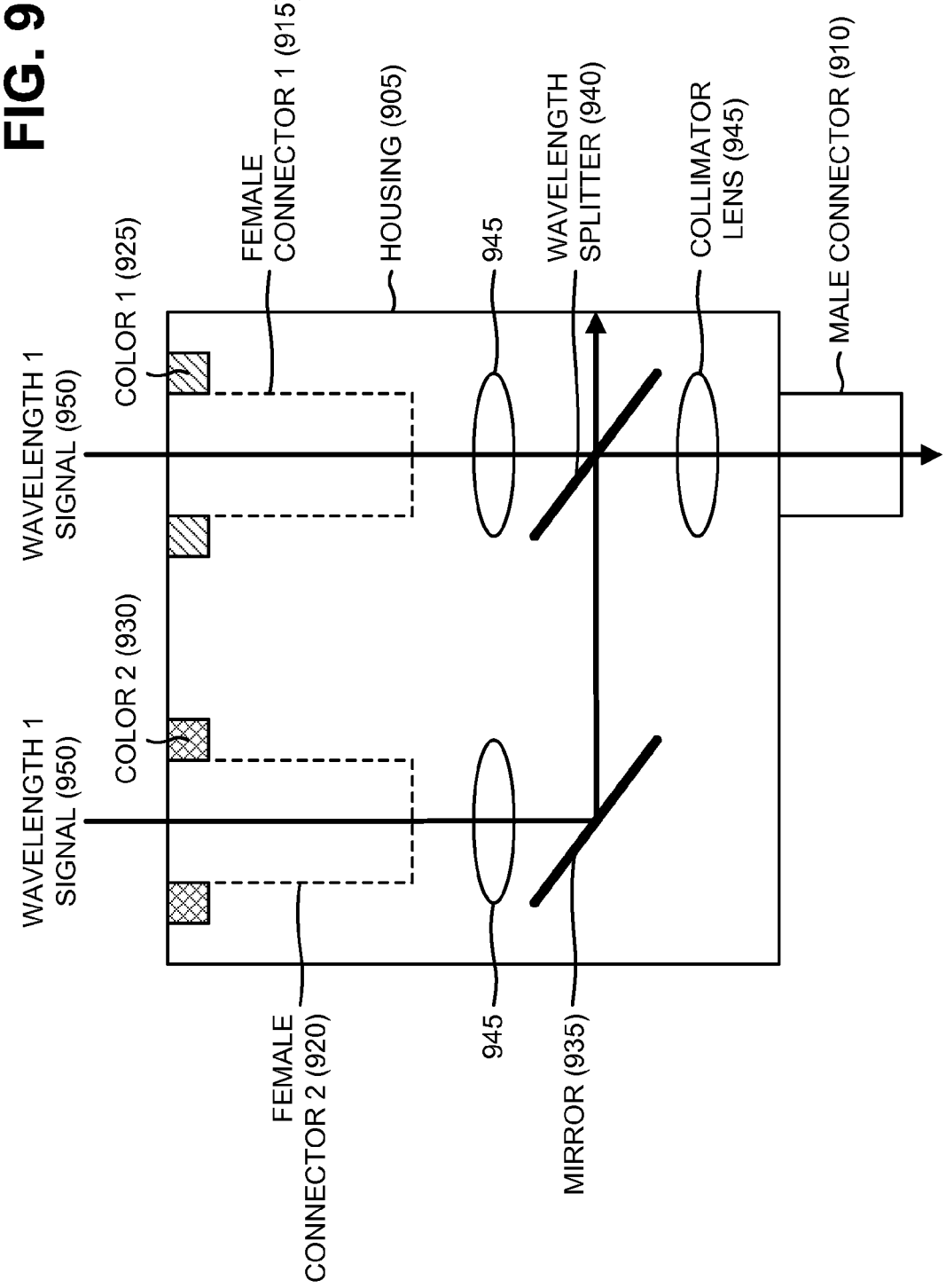

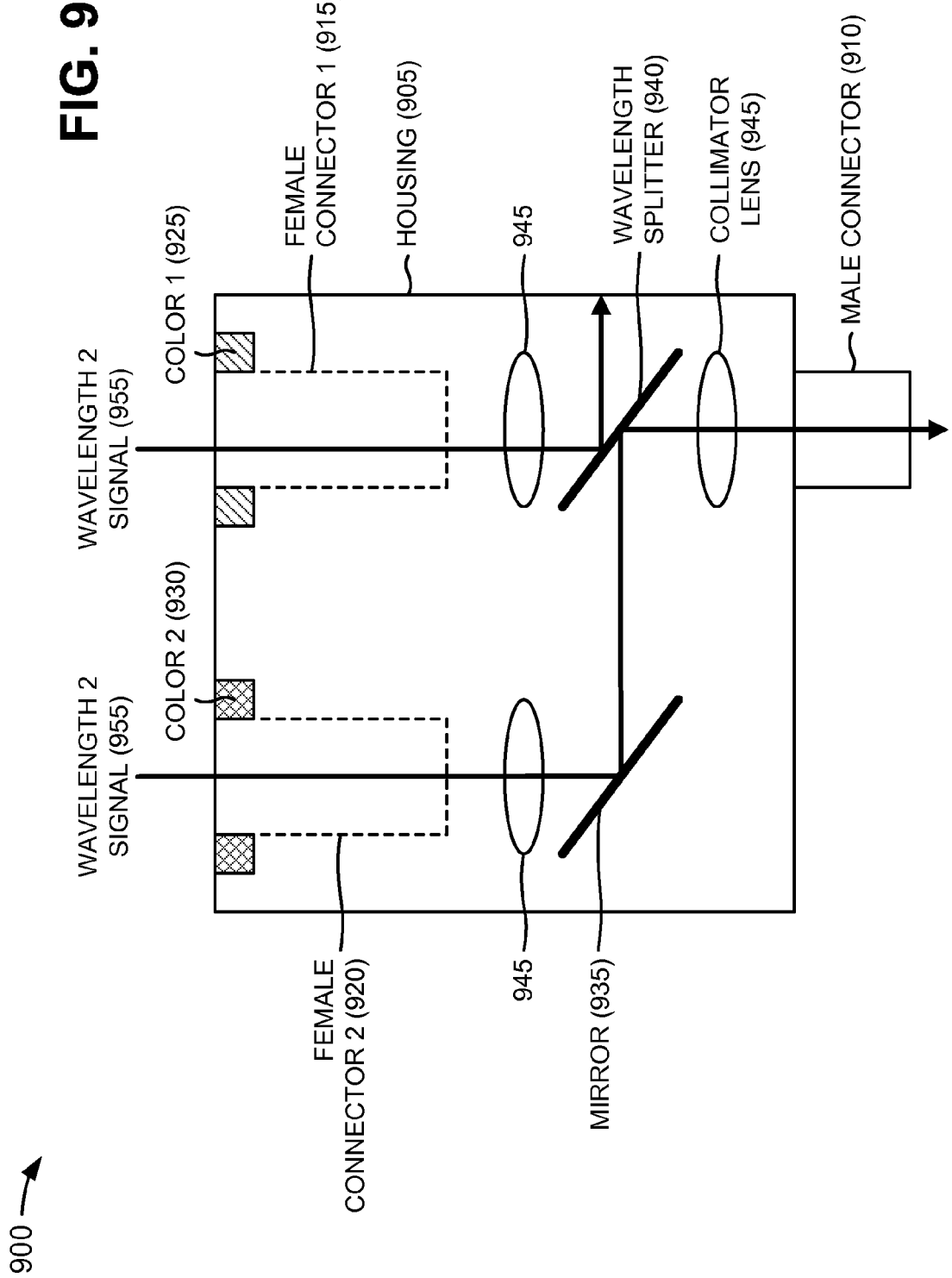

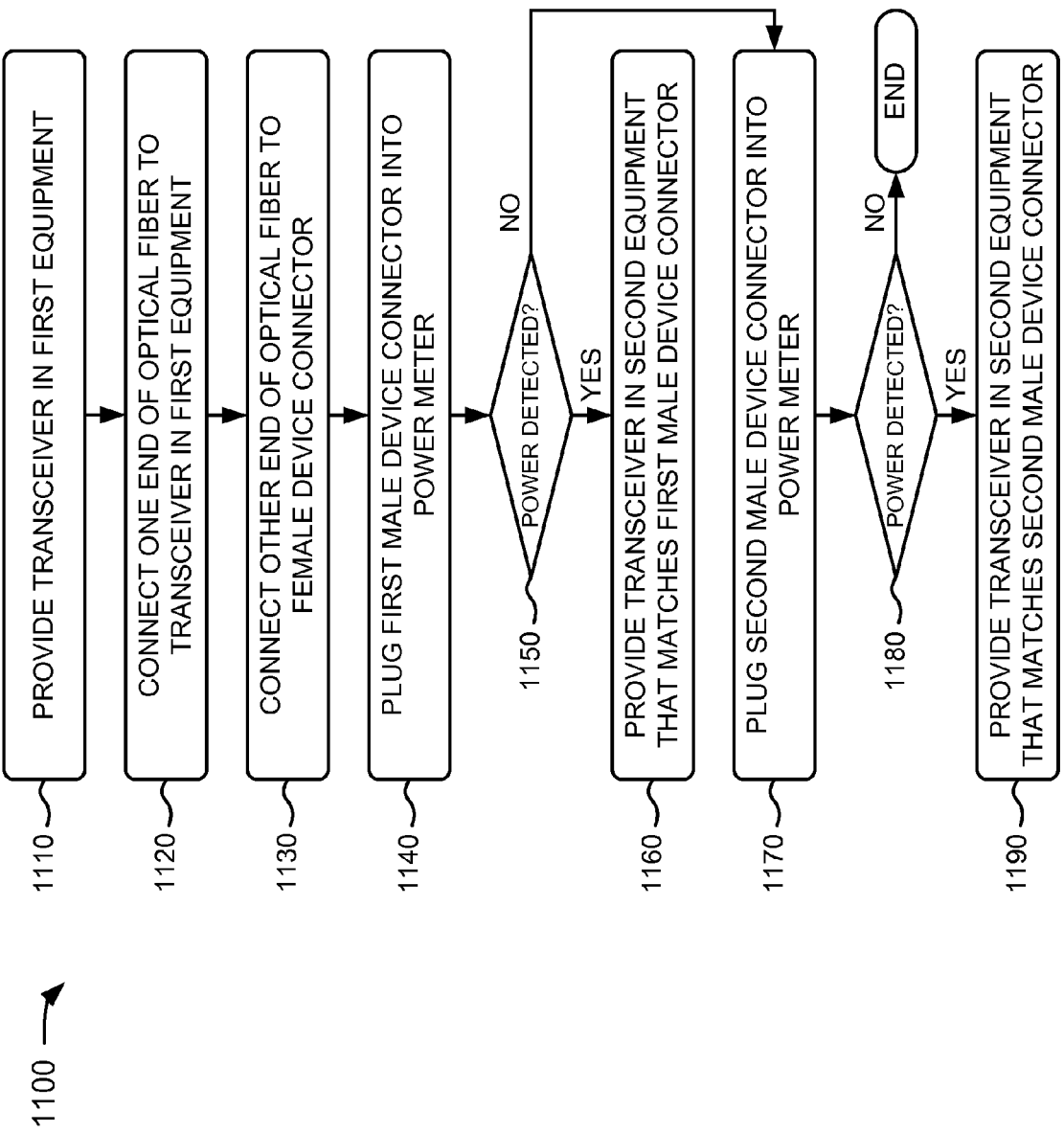

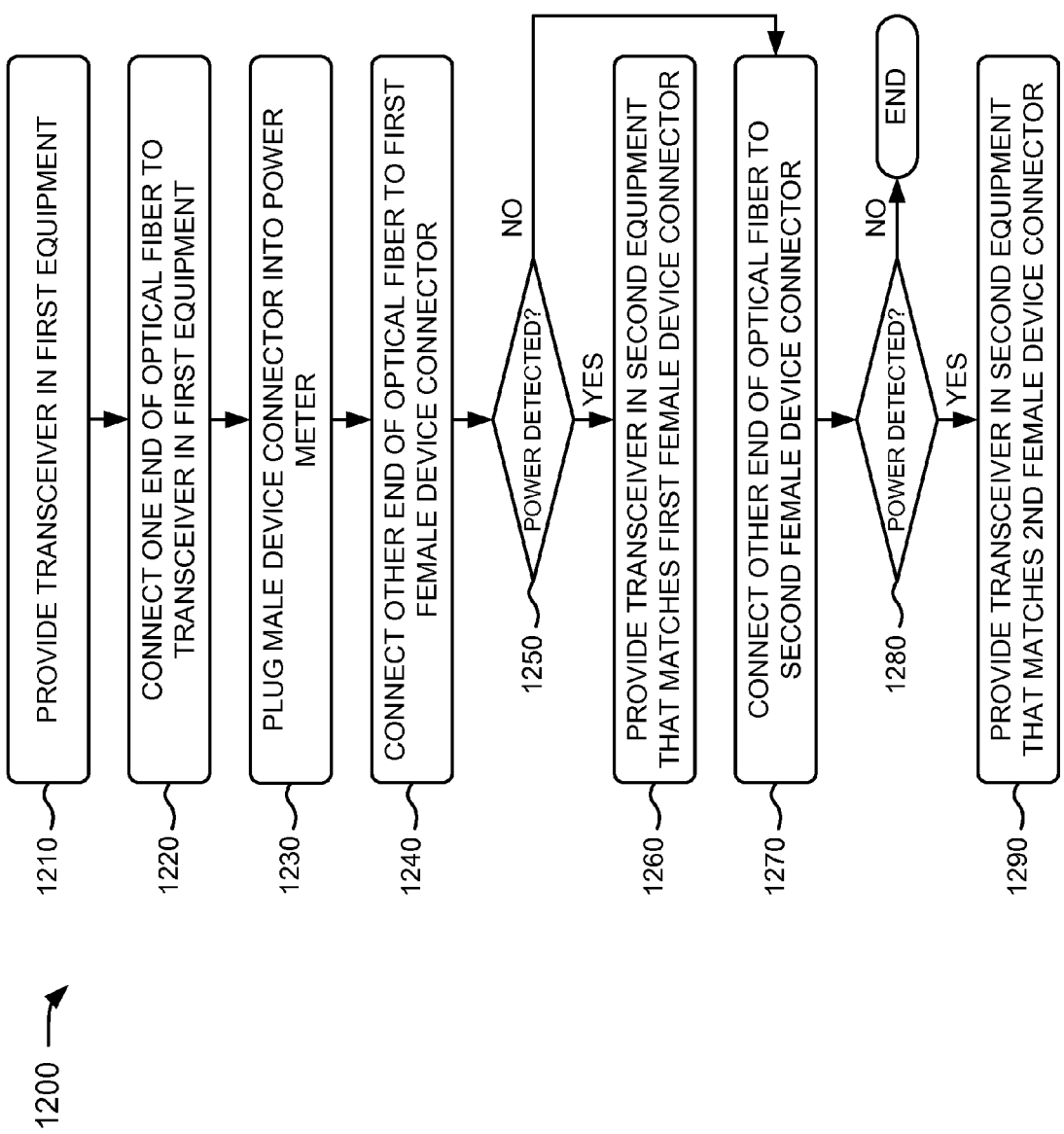

OPTICAL SIGNAL MEASUREMENT DEVICES

RELATED APPLICATION

This application is a continuation-in-part of U.S. patent application Ser. No. 11/612,218, filed Dec. 18, 2006, the entire content of which is hereby incorporated by reference.

BACKGROUND

Communications networks (e.g., optical communications networks) may contain several network conduits (e.g., optical fibers) that may need to be tested on a daily basis. An output (e.g., optical power) of a network conduit may be measured by measuring a connection point of the network conduit. A connection point may include a male connector interconnected with a female connector. Technicians typically need to measure optical power in both directions of a given connection point because many times technicians cannot determine whether a direction of the connection point is a transmit direction or a receive direction. For example, the labels for the transmit direction or the receive direction may be incorrect, or there may be incorrect connectors for the connection point.

To test a connection point, the male and female connectors may be disconnected and accessed with a measurement device (e.g., an optical power meter). Most existing optical power meters only have a single female receiver head for receiving male connectors. Typically, the male connector of the network may be provided within the single female receiver head of the power meter, and the power meter may measure the optical power output to or by the male network connector.

To measure the optical power of the female network connector, a jumper that includes the same type of connector as the female network connector may need to be located. One end of the jumper may be connected to the female network connector. The other end of the jumper may be provided within the single female receiver head of the power meter, and the power meter may measure the optical power output provided to or by the female network connector.

Thus, there may be several steps involved in measuring a single connection point of a network conduit, and the procedure may be very time consuming. Many times the measured optical power output of the first measured connector (i.e., the male network connector or the female network connector) may be forgotten by a technician prior to measuring the second measured connector, requiring the technician to duplicate measurement of the first connector.

Single fiber bi-directional communications (SFBDC) can eliminate half the amount of optical fiber needed for an optical network. Implementing SFBDC in an optical network (e.g., a dual fiber network) requires changing optical equipment transmitter/receiver modules to, for example, small form-factor pluggable (SFP) transceivers. Depending on designs, such a change can impact not only equipment architecture but also network operation procedures.

For example, some SFBDC solutions utilize two different types of SFPs (e.g., transmitting two different wavelengths, such as a "1550" nanometer (nm) wavelength and a "1310" nm wavelength). In such solutions, it is difficult for a field technician to identify which SFP should be used for an optical fiber because normal optical power meters are not able to distinguish a wavelength of a measured power. The field technician may utilize a special power meter (e.g., which can distinguish wavelengths) to identify which SFP should be used for an optical fiber. However, the special power meter is an expensive piece of equipment, and the technician would have to transport the special power meter in addition to a normal power meter.

BRIEF DESCRIPTION OF THE DRAWINGS

FIGS. 1A and 1B are diagrams of an example device in which systems and/or methods described herein may be implemented;

FIGS. 2A and 2B are diagrams of example pulley arrangements of the device of FIGS. 1A and 1B;

FIGS. 4A and 4B are diagrams of still another example device in which systems and/or methods described herein may be implemented;

FIG. 5 is a diagram of example components of the devices shown in FIGS. 1A, 1B, 3A-4B, 7, and 9A;

FIGS. 6A and 6B are diagrams of an example measurement of an optical signal(s) with the device shown in FIGS. 1A and 1B;

FIG. 7 is a diagram of an example device that enables wavelengths to be easily distinguished by systems and/or methods described herein;

FIGS. 8A-8C are diagrams of example optical signal measurements capable of being provided by the device shown in FIG. 7;

FIGS. 9A-9C are diagrams of another example device that enables wavelengths to be easily distinguished by systems and/or methods described herein;

FIG. 11 is a flow chart of an example process for identifying which transceiver to use for an optical fiber according to implementations described herein; and FIG. 12 is a flow chart of another example process for identifying which transceiver to use for an optical fiber according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may provide an optical signal measurement device that enables wavelengths to be distinguished (e.g., via a measured power) and identifies which transceiver to use for an optical fiber. For example, in one implementation, the systems and/or methods may provide a transceiver in a first piece of equipment, and may connect one end of an optical fiber to the transceiver. The systems and/or methods may connect another end of the optical fiber to a female connector of a device (e.g., an optical signal measurement device), and may plug a first male connector of the device into a power meter. If power is detected by the power meter, the systems and/or methods may provide a transceiver in a second piece of equipment that matches the first male connector. If power is not detected by the power meter, the systems and/or methods may plug a second male connector of the device into the power meter, and may determine if power is detected by the power meter. If power is detected by the power meter, the systems and/or methods may provide a transceiver in the second piece of equipment that matches the second male connector.

Although the systems and/or methods described herein relate to optical conduits or optical fibers, in other implementations, the systems and/or methods may be used in conjunction with other type of conduits. A "conduit," as the term is used herein, is to be broadly construed to include any electrical cable, optical cable, optical fiber, telephone cable, coaxial cable, copper conductors, or other like media used to transmit and/or receive data or information from one point to another.

The expression "optically communicates," as used herein, may refer to any connections, coupling, link, or other similar mechanism by which optical signals that may be carried by one optical component may be imparted to a communicating optical component. For example, "optically communicating" devices may not necessarily be directly connected to one another and may be separated by intermediate optical components or devices.

Figure 1B:
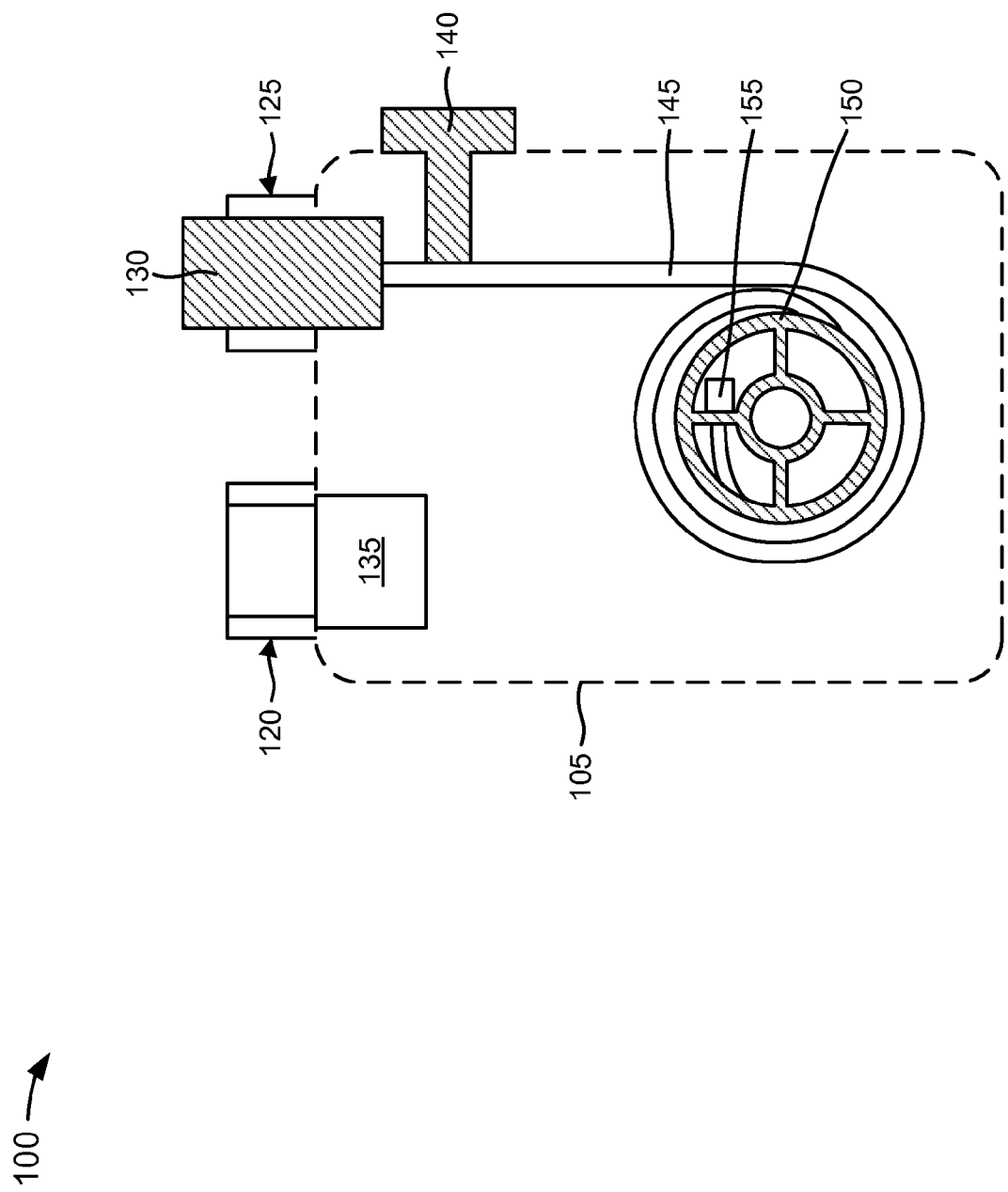

FIGS. 1A and 1B are diagrams of an example device 100 in which systems and/or methods described herein may be implemented. FIG. 1A depicts an external front view of device 100, and FIG. 1B depicts a partial internal front view of device 100. Device 100 may include any device used to measure properties of a conduit or another type of computation or communication device. For example, in one implementation, device 100 may include an optical power meter that measures a strength or power of an optical signal provided through a conduit. In other implementations, device 100 may include a photometer, a radiometer, etc.

As shown in FIG. 1A, device 100 may include a variety of components, such as a housing 105, control buttons 110, a display 115, a female receiver head 120, and/or a receiver head 125 through which a male connector 130 may extend from and/or retract into housing 105. Housing 105 may protect the components of device 100 from outside elements. Control buttons 110 may permit a user to interact with device 100 to cause device 100 to perform one or more operations. Display 115 may provide visual information to the user. For example, display 115 may provide information regarding a measurement result (e.g., "RESULT 1" or "RESULT 2") of female receiver head 120, a measurement result (e.g., "RESULT 1" or "RESULT 2") of male connector 130, etc.

Female receiver head 120 may be a point of attachment for a network conduit (not shown) and may be a point of entry for a male network connector (not shown) provided at one end of a network conduit (not shown). Female receiver head 120 may receive a variety of male network connectors. For example, female head receiver 120 may receive a male optical fiber connector (e.g., Local Connector (LC), Ferrule Connector (FC), Straight Tip (ST), Standard Connector (SC), biconic, Enterprise Systems Connection (ESCON), Fiber Connectivity (FICON), Fiber-Distributed Data Interface (FDDI), loopback, Opti-Jack, Mechanical Transfer Registered Jack (MT-RJ), D4, MTP, MU, SMA, etc. type connectors), a male electrical connector (e.g., a coaxial cable connector), etc. Female receiver head 120 may permit measurement by device 100 of an optical signal provided to or by the male network connector.

Receiver head 125 may provide an opening in housing 105 of device 100 to permit male connector 130 to extend from and/or retract into housing 105. Male connector 130 may connect to a female network connector of a network conduit (not shown) formerly connected to a male network connector (not shown). Male connector 130 may include a variety of male connectors. For example, male connector 130 may include a male optical fiber connector (e.g., Local Connector (LC), Ferrule Connector (FC), Straight Tip (ST), Standard Connector (SC), biconic, Enterprise Systems Connection (ESCON), Fiber Connectivity (FICON), Fiber-Distributed Data Interface (FDDI), loopback, Opti-Jack, Mechanical Transfer Registered Jack (MT-RJ), D4, MTP, MU, SMA, etc. type connectors), a male electrical connector (e.g., a coaxial cable connector), etc. Male connector 130 may permit measurement by device 100 of an optical signal provided to or by the female network connector.

As shown in FIG. 1B, device 100 may further include an optical detector 135 corresponding to female receiver head 120, a latch gear 140, a jumper 145 coupled to male connector 130, a pulley 150, and/or an optical detector 155 corresponding to male connector 130.

Optical detectors 135 and 155 may optically communicate with the male network connector (not shown) and the female network connector (not shown), respectively, in order to measure the power of optical signals provided to or by these network devices. Optical detectors 135 and 155 may include a variety of detectors, such as photon detectors (i.e., detectors where light energy may interact with electrons in the detectors' material and may generate free electrons), thermal detectors (i.e., detectors that may respond to heat energy delivered by light), etc. Photon detectors may further include photoconductive detectors (i.e., incoming light may produce free electrons which can carry electrical current so that the electrical conductivity of the detector material may change as a function of the intensity of the incident light), photovoltaic detectors (a voltage may be generated if optical energy strikes the device), photoemissive detectors (incident photons may release electrons from the surface of the detector material, and the free electrons may be collected in an external circuit), etc. In other implementations, optical detectors 135 and 155 may be replaced with electrical detectors, e.g., if the network devices provide electrical signals instead of optical signals.

Optical detector 135 may be coupled to female receiver head 120, and optical detector 155 may be coupled to pulley 150 and jumper 145, as shown in FIG. 1B. Optical detectors 135 and 155 may provide the measured power of the optical signals to other components of device 100. For example, in one implementation, optical detector 135 may provide the measured power of the male network connector to display 115, and display 115 may provide visual information (e.g., "RESULT 1" or "RESULT 2") indicating the measured power. Additionally or alternatively, optical detector 155 may provide the measured power of the female network connector to display 115, and display 115 may provide visual information (e.g., "RESULT 1" or "RESULT 2") indicating the measured power. In other implementations, optical detectors 135 and 155 may provide the measured power of the optical signals to processing logic of device 100, and the processing logic may compare, perform statistics on, transmit, etc. the measured power of the optical signals.

Latch gear 140 may include a mechanism that retains jumper 145 at a desired location. For example, latch gear 140 may frictionally engage jumper 145, and may prevent jumper 145 from retracting through receiver head 125. A retracting or rewinding force may be applied to jumper 145 via a spring-loaded mechanism provided in pulley 150, as described below. In other implementations, latch gear 140 may be replaced with other mechanisms capable of retaining jumper 145 at a desired location.

Jumper 145 may be coupled at one end to male connector 130, and may be coupled at another end to optical detector 155. Jumper 145 may include a conduit for communicating data or information from male connector 130 to optical detector 155. For example, in one implementation, jumper 145 may include an optical fiber that communicates optical signals received by male connector 130 to optical detector 155. In other implementations, jumper 145 may include an electrical cable that communicates electrical signals received by male connector 130 to an electrical detector.

Pulley 150 may provide a mechanism to rewind jumper 145 and/or male connector 130 if not in use. Additional details of pulley 150 are provided below in connection with FIGS. 2A and 2B.

Although FIGS. 1A and 1B show example components of device 100, in other implementations, device 100 may include fewer components, different components, differently arranged components, and/or additional components than those depicted in FIGS. 1A and 1B. For example, although FIGS. 1A and 1B show two optical detectors for device 100, in other implementations, device 100 may include more than two optical detectors. Alternatively, or additionally, one or more components of device 100 may perform one or more other tasks described as being performed by one or more other components of device 100.

Figure 2B:
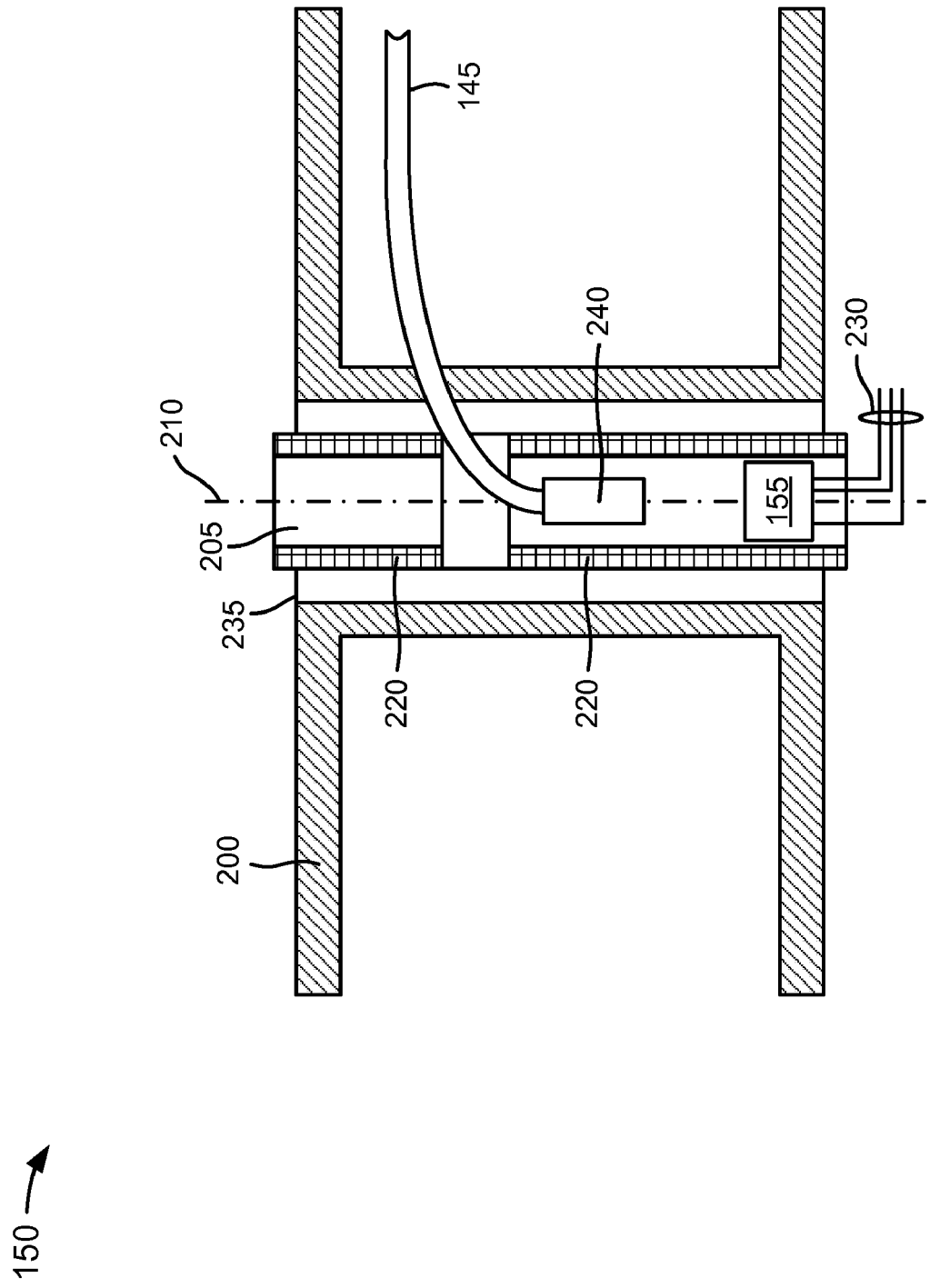

FIGS. 2A and 2B are diagrams of example arrangements of pulley 150 and other components of device 100. As shown in the first example arrangement of FIG. 2A, pulley 150 may include a reel portion 200, a fixed shaft 205, an axis 210 of shaft 205, conductive contacts 215, conductive portions 220 surrounding shaft 205, conductive wires 225, wires 230 supplying power to optical detector 155, and/or a spring-loaded mechanism 235. As further shown in FIG. 2A, optical detector 155 may connect to reel portion 200 of pulley 150, and may optically communicate with jumper 145.

Reel portion 200 may include a mechanism (e.g., a cylinder) around which lengths of another material (e.g., jumper 145) may be wound for storage. For example, in one implementation, reel portion 200 may include a cylindrical core and walls on the sides to retain the material (e.g., jumper 145) wound around the core. The size of reel portion 200 may depend on a variety of factors. For example, reel portion 200 may be sized to fit within housing 105, may be sized to permit an entire length of jumper 145 to be stored, etc.

Reel portion 200 may rotatably connect to shaft 205, and may rotate about axis 210 of shaft 205. For example, reel portion 200 may rotate in one direction to wind jumper 145, and may rotate in an opposite direction to unwind jumper 145. Shaft 205 may be a variety of shapes and sizes, depending upon the size and shape of device 100 and/or pulley 150. For example, in one implementation, shaft 205 may be cylindrical in shape and may be sized to accommodate the desired size of the core of reel portion 200.

Conductive contacts 215 may electrically couple conductive wires 225 to optical detector 155, via conductive portions 220 and wires 230, in order to provide power to optical detector 155. For example, conductive wires 225 may provide electrical power or energy to conductive portions 220. Conductive portions 220 may transfer the power to conductive contacts 215, and conductive contacts 215 may transfer the power to optical detector 155 via wires 230. Optical detector 155 may utilize the power to energize components provided therein for measuring, e.g., optical signals provided to or by jumper 145.

Conductive contacts 215 may include conductive materials (e.g., metals, plated metals, etc.) and may form circuits when they engage conductive portions 220. Conductive contacts 215 may electrically couple to wires 230 and may provide electrical power to optical detector 155, via wires 230. Conductive portions 220 may be provided around an outer surface of fixed shaft 205, and may be made from a conductive material such as metals, plated metals, etc. Conductive portions 220 may engage conductive contacts 215 to form circuits and may be electrically coupled to wires 225 to provide electrical power from wires 225 to optical detector 155. Wires 225 and 230 may include any type of conductive material, such as metals (e.g., copper, aluminum, gold, etc.), plated metals, etc.

Spring-loaded mechanism 235 may provide a mechanism that automatically rewinds jumper 145 onto reel portion 200 of pulley 150. For example, in one implementation, spring-loaded mechanism 235 may provide a constant rotational force on reel portion 200 in a direction that may wind jumper 145 onto reel portion 200. A user of device 100 may pull jumper 145 from housing 105 to a desired length extending away from housing 150, e.g., so that a network device may be measured and/or tested via male connector 130. Latch gear 140 may retain jumper 145 at the desired length by preventing the rotational force of spring-loaded mechanism 235 from rewinding jumper 145 onto reel portion 200. If latch gear 140 disengages jumper 145, the rotational force of spring-loaded mechanism 235 may automatically rewind jumper 145 onto reel portion 200.

As shown in the second example arrangement of FIG. 2B, pulley 150 may include reel portion 200, fixed shaft 205, wires 230 supplying power to optical detector 155, and/or spring-loaded mechanism 235, as described above in connection with FIG. 2A. Optical detector 155 may alternatively be provided on fixed shaft 205 rather than reel portion 200, and may be prevented from rotating. Wires 230 may alternatively be directly coupled to optical detector 155. In such an arrangement, conductive contacts 215, conductive portions 220, and conductive wires 225 may be omitted.

As further shown in FIG. 2B, one end of jumper 145 may include a collimator 240 that may optically communicate with optical detector 155. In one implementation, collimator 240 may connect to the core of reel portion 200 and may rotate with reel portion 200. Collimator 240 may optically communicate with optical detector 155 so that optical signals from jumper 145 may be measured if collimator 240 aligns with or substantially aligns with optical detector 155. For example, collimator 240 may align with optical detector 155 if jumper 145 is completely unwound from reel portion 200. In other implementations, collimator 240 may connect to fixed shaft 205 and may align with optical detector 155 on fixed shaft 205. Collimator 240 may include a device that filters a stream of light rays so that rays traveling parallel to a specified direction may be allowed through collimator 240.

Although FIGS. 2A and 2B show example components of pulley 150, in other implementations, pulley 150 may include fewer components, different components, differently arranged components, and/or additional components than those depicted in FIGS. 2A and 2B. Alternatively, or additionally, one or more components of pulley 150 may perform one or more other tasks described as being performed by one or more other components of pulley 150.

Figure 3A:
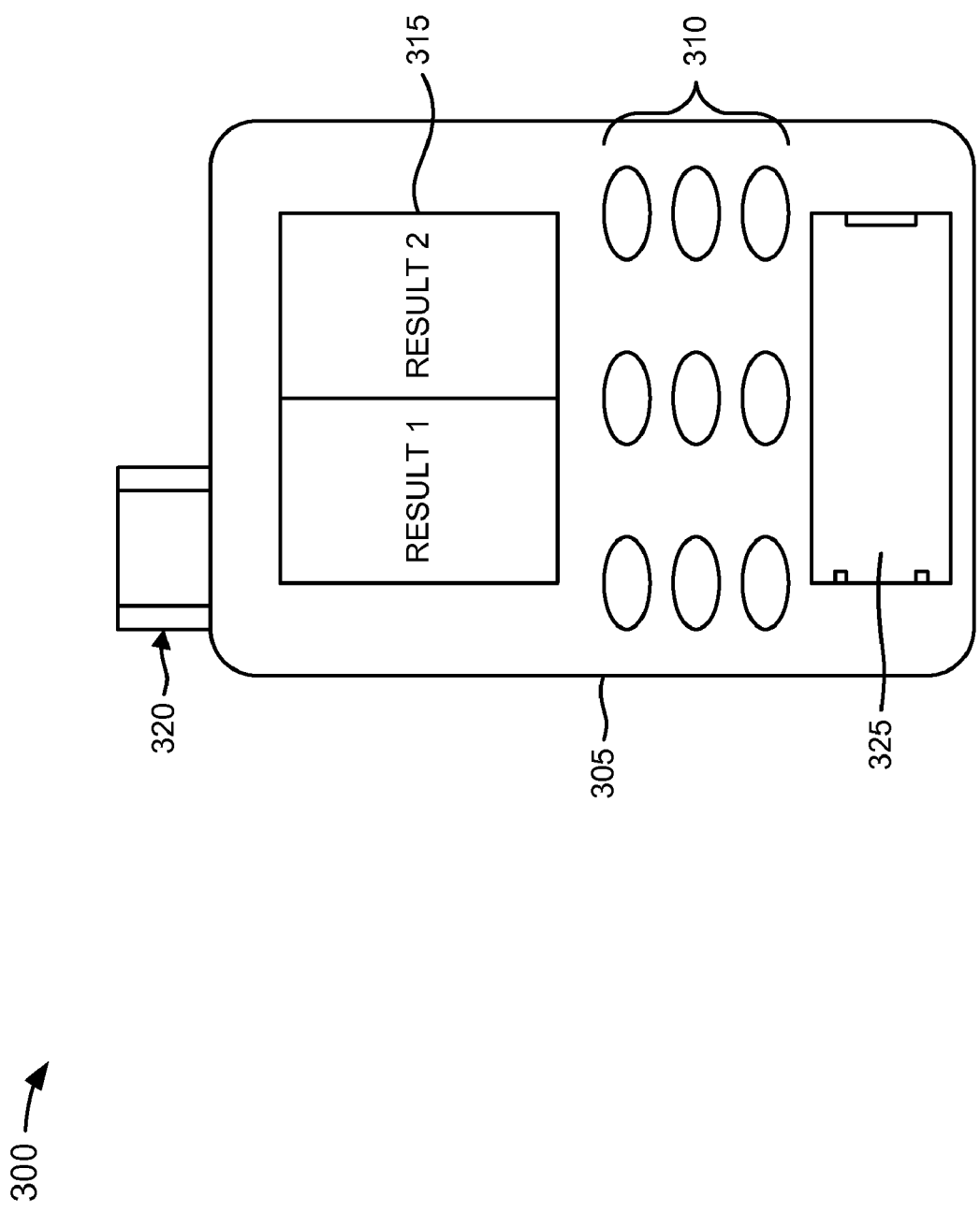
FIGS. 3A and 3B are diagrams of another example device in which systems and/or methods described herein may be implemented.
Figure 3B:
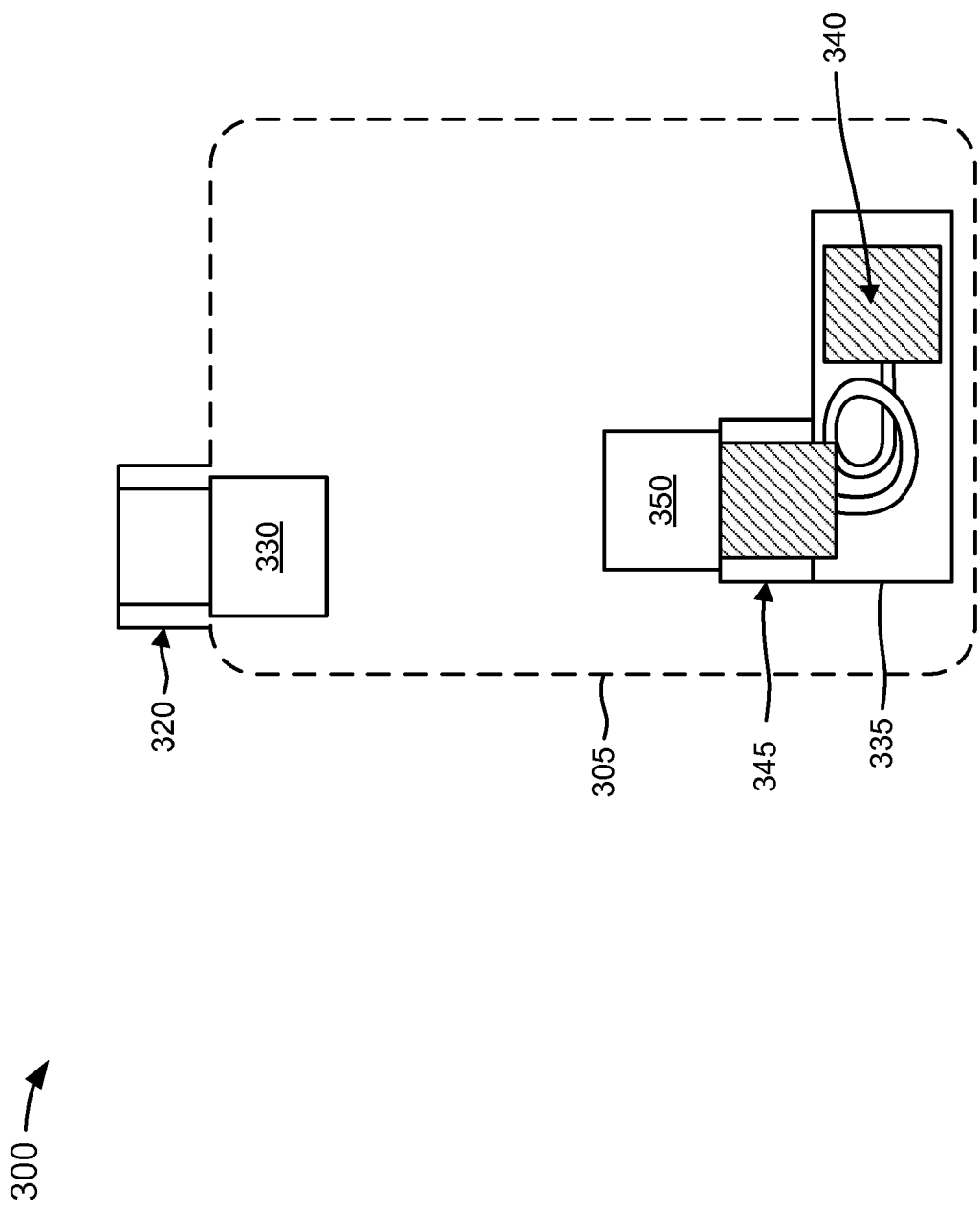

FIGS. 3A and 3B are diagrams of another example device 300 in which systems and/or methods described herein may be implemented. FIG. 3A depicts an external front view of device 300, and FIG. 3B depicts a partial internal front view of device 300. Device 300 may include any device used to measure properties of a conduit or another type of computation or communication device. For example, in one implementation, device 300 may include an optical power meter that measures a strength or power of an optical signal provided through a conduit. In other implementations, device 300 may include a photometer, a radiometer, etc.

As shown in FIG. 3A, device 300 may include a variety of components, such as a housing 305, control buttons 310, a display 315, a female receiver head 320, and/or a storage compartment 325. Housing 305 may protect the components of device 300 from outside elements. Control buttons 310 may permit a user to interact with device 300 to cause device 300 to perform one or more operations. Display 315 may provide visual information to the user. For example, display 315 may provide information regarding a measurement result (e.g., "RESULT 1" or "RESULT 2") of female receiver head 320, a measurement result (e.g., "RESULT 1" or "RESULT 2") of a jumper stored in storage compartment 325, etc.

Female receiver head 320 may be a point of attachment for a network conduit (not shown) and may be a point of entry for a male network connector (not shown) provided at one end of the network conduit. Female receiver head 320 may permit measurement by device 300 of an optical signal provided to or by the network conduit. In one implementation, for example, female receiver head 320 may function in a similar manner as female receiver head 120 of device 100, and may contain similar components and/or features as female receiver head 120 of device 100.

Storage compartment 325 may provide storage for a jumper and corresponding connectors (not shown). Although FIG. 3A shows storage compartment 325 as including a hinged cover (e.g., similar to a battery storage compartment), in other implementations, storage compartment 325 may include other types of covers (e.g., a sliding cover, etc.).

As shown in FIG. 3B, device 300 may further include an optical detector 330 corresponding to female receiver head 320, an opening 335 of storage compartment 325, a jumper 340 coupled to a male connector on one end and a male or a female connector on another end, a receiver head 345 for receiving the male/female connector of jumper 340, and/or an optical detector 350 corresponding to the male/female connector of jumper 340.

Optical detectors 330 and 350 may optically communicate with the male network connector (not shown) and the female network connector (not shown), respectively, in order to measure the power of optical signals provided to or by these network devices. Optical detector 330 may be coupled to female receiver head 320, and optical detector 350 may be coupled to the male/female connector of jumper 340 via receiver head 345. Optical detector 350 may optically communicate with the female network connector (not shown) via optical communication with the male connector of jumper 340, jumper 340, and the male/female connector of jumper 340. In one implementation, for example, optical detectors 330 and 350 may function in a similar manner as optical detectors 135 and 155 of device 100, and may contain similar components and/or features as optical detectors 135 and 155 of device 100.

Opening 335 of storage compartment 325 may be sized and shaped to accommodate the desired length of jumper 340. For example, opening 335 may be large enough to accommodate a jumper having a length that may extend to and/or measure an optical signal provided to or by the female network connector.

The male connector of jumper 340 may connect to a female network connector (not shown) formerly connected to a male network connector (not shown) provided at one end of a network conduit. The male connector of jumper 340 may permit measurement by device 300 of an optical signal provided to or by the female network connector. In one implementation, for example, the male connector of jumper 340 may function in a similar manner as male connector 130 of device 100, and may contain similar components and/or features as male connector 130 of device 100.

The female/male connector of jumper 340 may couple jumper 340 to optical detector 350, and may permit optical communication between the female network connector and optical detector 350.

Jumper 340 may include a conduit for communicating data or information from its male connector to optical detector 350. In one implementation, for example, jumper 340 may function in a similar manner as jumper 145 of device 100, and may contain similar components and/or features as jumper 145 of device 100.

Although FIGS. 3A and 3B show example components of device 300, in other implementations, device 300 may include fewer components, different components, differently arranged components, and/or additional components than those depicted in FIGS. 3A and 3B. For example, although FIGS. 3A and 3B show two optical detectors for device 300, in other implementations, device 300 may include more than two optical detectors. Alternatively, or additionally, one or more components of device 300 may perform one or more other tasks described as being performed by one or more other components of device 300.

FIGS. 4A and 4B are diagrams of still another example device 400 in which systems and/or methods described herein may be implemented. FIG. 4A depicts an external front view of device 400, and FIG. 4B depicts a partial internal front view of device 400. Device 400 may include any device used to measure properties of a conduit or another type of computation or communication device. For example, in one implementation, device 400 may include an optical power meter that measures a strength or power of an optical signal provided through a conduit. In other implementations, device 400 may include a photometer, a radiometer, etc.

As shown in FIG. 4A, device 400 may include a variety of components, such as a housing 405, control buttons 410, a display 415, a female receiver head 420, a receiver head 425, a receiver head 430, a jumper 435 coupled to a male connector 440 on one end and a male or a female connector 445 on another end, and/or a handle 450 that may connect to housing 405 via arms 455 and 460. As shown in FIG. 4B, device 400 may further include an optical detector 465 corresponding to female receiver head 420, and/or an optical detector 470 corresponding to male/female connector 445 of jumper 435.

Housing 405 may protect the components of device 400 from outside elements. Control buttons 410 may permit a user to interact with device 400 to cause device 400 to perform one or more operations. Display 415 may provide visual information to the user. For example, display 415 may provide information regarding a measurement result (e.g., "RESULT 1" or "RESULT 2") of female receiver head 420, a measurement result (e.g., "RESULT 1" or "RESULT 2") of male connector 440 of jumper 435, etc.

Female receiver head 420 may be a point of attachment for a network conduit (not shown) and may be a point of entry for a male network connector (not shown) provided at one end of the network conduit. Female receiver head 420 may permit measurement by device 400 of an optical signal provided to or by the network conduit. In one implementation, for example, female receiver head 420 may function in a similar manner as female receiver head 120 of device 100, and may contain similar components and/or features as female receiver head 120 of device 100.

Receiver head 425 may provide an opening in housing 405 of device 400 to store male connector 440 of jumper 435 if not in use. Receiver head 430 may provide an opening in housing 405 of device 400 to store male/female connector 445 of jumper 435 if not in use. Receiver head 430 may also couple optical detector 470 to male/female connector 445 of jumper 435.

Jumper 435 may include a conduit for communicating data or information from male connector 440 to optical detector 470. In one implementation, for example, jumper 435 may function in a similar manner as jumper 145 of device 100, and may contain similar components and/or features as jumper 145 of device 100.

Male connector 440 of jumper 435 may connect to a female network connector (not shown) formerly connected to a male network connector (not shown) provided at one end of a network conduit. Male connector 440 may permit measurement by device 400 of an optical signal provided to or by the female network connector. In one implementation, for example, male connector 440 may function in a similar manner as male connector 130 of device 100, and may contain similar components and/or features as male connector 130 of device 100.

Female/male connector 445 may couple jumper 435 to optical detector 470, and may permit optical communication between the female network connector and optical detector 470 via male connector 440 and jumper 435.

Optical detectors 465 and 470 may optically communicate with the male network connector (not shown) and the female network connector (not shown), respectively, in order to measure the power of optical signals provided to or by these network devices. Optical detector 465 may be coupled to female receiver head 420, and optical detector 470 may be coupled to male/female connector 445 of jumper 435 via receiver head 430. Optical detector 470 may optically communicate with the female network connector (not shown) via optical communication with male connector 440 of jumper 435, jumper 435, and male/female connector 445 of jumper 435. In one implementation, for example, optical detectors 465 and 470 may function in a similar manner as optical detectors 135 and 155 of device 100, and may contain similar components and/or features as optical detectors 135 and 155 of device 100.

Handle 450 may be sized and shaped to accommodate the desired length of jumper 435. For example, handle 450 may be sized to accommodate a jumper having a length that may extend to and/or measure an optical signal provided to or by the female network connector. As shown in FIGS. 4A and 4B, arms 455 and 460 may extend away from and connect handle 450 to housing 405. In one implementation, the lengths of arms 455 and 460 may sized to accommodate a jumper having a length that may extend to and/or measure an optical signal provided to or by the female network connector.

Although FIGS. 4A and 4B show example components of device 400, in other implementations, device 400 may include fewer components, different components, differently arranged components, and/or additional components than those depicted in FIGS. 4A and 4B. For example, although FIGS. 4A and 4B show two optical detectors for device 400, in other implementations, device 400 may include more than two optical detectors. Alternatively, or additionally, one or more components of device 400 may perform one or more other tasks described as being performed by one or more other components of device 400.

FIG. 5 is a diagram of example components of a device 500 that may correspond to one of devices 100, 300, or 400 depicted in FIGS. 1A, 1B, and 3A-4B. Device 500 may also correspond to one of devices 700 or 900 depicted in FIGS. 7 and 9A (described below). As shown in FIG. 5, device 500 may include a processing unit 510, memory 520, a user interface 530, a communication interface 540, an antenna assembly 550, and an output information gatherer 560. Processing unit 510 may include a processor, a microprocessor, an application specific integrated circuit (ASIC), a field programmable gate array (FPGA), or the like. Memory 520 may include a random access memory (RAM), a read only memory (ROM), and/or another type of memory to store data and instructions that may be used by processing unit 510 to control operation of device 500 and its components.

User interface 530 may include mechanisms for inputting information to device 500 and/or for outputting information from device 500. Examples of input and output mechanisms might include buttons (e.g., a joystick, control buttons 110/310/410 and/or keys of a keypad) to permit data and control commands to be input into device 500, a display (e.g., displays 115/315/415) to output visual information (e.g., information regarding measured optical signals), and/or optical detectors (e.g., optical detectors 135/155/330/350/465/470) to output measured optical signals.

Communication interface 540 may include, for example, a transmitter that may convert baseband signals from processing unit 510 to radio frequency (RF) signals and/or a receiver that may convert RF signals to baseband signals. Alternatively, communication interface 540 may include a transceiver to perform functions of both a transmitter and a receiver. Communication interface 540 may connect to antenna assembly 550 for transmission and reception of the RF signals. In one implementation, for example, communication interface 540 may communicate with a network (e.g., a local area network (LAN), a wide area network (WAN), a telephone network, such as the Public Switched Telephone Network (PSTN), an intranet, the Internet, or a combination of networks) or a network component (e.g., a personal computer, a laptop, or another type of computation or communication device) to provide measured optical signals (e.g., to a database).

Output information gatherer 560 may obtain output information from device 500. In one implementation, the output information may correspond to measured optical signals stored on device 500 or received by device 500. In this case, output information gatherer 560 may include a media storage device (e.g., memory 520), or a communication device (e.g., communication interface 540) capable of receiving output information from another source (e.g., wired or wireless communication with an external media storage device). In another implementation, the output information may correspond to output captured or retrieved by device 500. In this case, output information gatherer 560 may include optical detectors (e.g., optical detectors 135/155/330/350/465/470) that may record measured optical signals. The captured output information may or may not be stored in a media storage device (e.g., memory 520).

As described herein, device 500 may perform certain operations in response to processing unit 510 executing software instructions contained in a computer-readable medium, such as memory 520. A computer-readable medium may be defined as a physical or logical memory device. A logical memory device may include memory space within a single physical memory device or spread across multiple physical memory devices. The software instructions may be read into memory 520 from another computer-readable medium or from another device via communication interface 540. The software instructions contained in memory 520 may cause processing unit 510 to perform processes described herein. Alternatively, hardwired circuitry may be used in place of or in combination with software instructions to implement processes described herein. Thus, implementations described herein are not limited to any specific combination of hardware circuitry and software.

Although FIG. 5 shows example components of device 500, in other implementations, device 500 may include fewer components, different components, differently arranged components, and/or additional components than those depicted in FIG. 5. For example, in one implementation, antenna assembly 550 may include one or more antennas to transmit and receive RF signals over the air. Antenna assembly 550 may receive RF signals from communication interface 540 and may transmit them over the air, and may receive RF signals over the air and may provide them to communication interface 540. Alternatively, or additionally, one or more components of device 500 may perform one or more other tasks described as being performed by one or more other components of device 500.

FIGS. 6A and 6B depict example measurement of an optical signal(s) with device 100, although devices 300 and 400 may also be used in the example measurement. As shown in FIG. 6A, a network device (e.g., an optical patch panel 600) may include adaptors 610, a female network connector 620, and/or a male network connector 630. A single adaptor 610 may couple female network connector 620 to male network connector 630 so that the connectors may optically communicate with each other. Although optical patch panel 600 shows a single female network connector and a single male network connector, in other implementations, panel 600 may include more female and male network connectors.

In order to measure an optical signal(s) from female network connector 620 and/or male network connector 630 with device 100, male network connector 630 may be disconnected from adaptor 610 and may be provided within female receiver head 120 of device, as shown in FIG. 6B. Male connector 130 of jumper 145 may be extended away from device 100 and may be provided within adaptor 610 at the location vacated by male network connector 630. At this point female network connector 620 and male network connector 630 may optically communicate with device 100, and may be ready for measurement.

A user may select a measurement to perform (e.g., via control buttons 110), and device 100 may perform optical signal measurements of female network connector 620 and/or male network connector 630. For example, in one implementation, optical detector 135 of device 100 may provide the measured power of male network connector 630 to display 115, and display 115 may provide visual information (e.g., "RESULT 1" or "RESULT 2") indicating the measured power. In other implementations, optical detector 155 of device 100 may provide the measured power of female network connector 620 to display 115, and display 115 may provide visual information (e.g., "RESULT 1" or "RESULT 2") indicating the measured power. In still other implementations, optical detectors 135 and 155 may provide the measured power of the optical signals to processing logic of device 100 (e.g., processing logic 510), and the processing logic may compare, perform statistics on, transmit (e.g., via communication interface 540 to a database external to device 100), etc. the measured power of the optical signals. The comparison or statistical results may be displayed, stored, and/or transmitted by device 100.

For example, in one example implementation, device 100 may compare the measured power of female network connector 620 to the measured power of male network connector 630 to determine which connector (or if both connectors) are the source of a signaling problem in the network. A variety of statistics may be performed on the measured powers. For example, the measured powers may be statistically compared to powers measured at other connection points of the network, or may be statistically compared to previously measured powers at the same connection point of the network (e.g., this may help calculate signal degradation over time).

If the measurement is complete, male connector 130 of jumper 145 may be removed from adaptor 610 and may be automatically retracted into device 100 (e.g., via spring-loaded mechanism 235). Male network connector 630 may be returned to adaptor 610 to optically communicate with female network connector 620.

Such an arrangement may measure two optical signals (e.g., one from female network connector 620 and one from male network connector 630) simultaneously. This may simplify the optical measurement procedure to a single step, which may save time and money. Such an arrangement also may not require the technician to remember measured values or to find a jumper, and may permit quicker identification of a transmission problem in the network.

FIG. 7 is a diagram of an example device 700 that enables wavelengths to be easily distinguished by systems and/or methods described herein. Device 700 may include any device used to determine wavelengths of a conduit. For example, in one implementation, device 700 may be utilized with an optical power meter that measures a strength or power of an optical signal provided through a conduit. Based on the measurements obtained by the optical power meter, device 700 may enable wavelengths of the conduit to be determined. The wavelengths of the conduit may be used to determine which type of transceiver to install in a piece of equipment (e.g., a network device).

As shown in FIG. 7, device 700 may include a variety of components, such as a housing 705, a female connector 710, a first male connector 715, a second male connector 720, a first color 725 associated with first male connector 715, a second color 730 associated with second male connector 720, three collimator lenses 735, and a wavelength splitter 740.

Housing 705 may protect the components of device 700 from outside elements. Housing 705 may be made from a variety of materials (e.g., metal, plastic, etc.) and may be sized to accommodate other components of device 700.

Female connector 710 may be provided in housing 705. Female connector 710 may be a point of attachment for a network conduit (e.g., connected to a piece of equipment, not shown) and may be a point of entry for a male network connector (not shown) provided at one end of the network conduit. Female connector 710 may receive a variety of male network connectors. For example, female connector 710 may receive a male optical fiber connector (e.g., LC, FC, ST, SC, biconic, ESCON, FICON, FDDI, loopback, Opti-Jack, MT-RJ, D4, MTP, MU, SMA, etc. type connectors), a male electrical connector (e.g., a coaxial cable connector), etc. Female connector 710 may permit wavelength measurement, by device 700, of an optical signal provided to or by the network conduit.

First male connector 715 may be communicatively connected with components within housing 705 and may extend away from housing 705. First male connector 715 may optically communicate with female connector 710 via the top two collimator lenses 735 and wavelength splitter 740. First male connector 715 may permit wavelength measurement, by device 700, of an optical signal provided to or by female connector 710. First male connector 715 may include a variety of male connectors. For example, first male connector 715 may include a male optical fiber connector (e.g., LC, FC, ST, SC, biconic, ESCON, FICON, FDDI, loopback, Opti-Jack, MT-RJ, D4, MTP, MU, SMA, etc. type connectors), a male electrical connector (e.g., a coaxial cable connector), etc.

Second male connector 720 may be communicatively connected with components within housing 705 and may extend away from housing 705. Second male connector 720 may optically communicate with female connector 710 via the top left collimator lens 735, the bottom collimator lens 735, and wavelength splitter 740. Second male connector 715 may permit wavelength measurement (e.g., a different wavelength than measured by first male connector 715), by device 700, of an optical signal provided to or by female connector 710. Second male connector 720 may include a variety of male connectors. For example, second male connector 720 may include a male optical fiber connector (e.g., LC, FC, ST, SC, biconic, ESCON, FICON, FDDI, loopback, Opti-Jack, MT-RJ, D4, MTP, MU, SMA, etc. type connectors), a male electrical connector (e.g., a coaxial cable connector), etc.

First color 725 may be associated with first male connector 715, and may provide an indication of a wavelength received by first male connector 715. For example, first color 725 may be blue (or some other color) and may indicate that a "1310" nm wavelength is received by first male connector 715 (e.g., when first male connector 715 is coupled to an optical power meter and the optical power meter reads an optical power). In other implementations, first color 725 may be replaced with other types of indicators (e.g., a graphic pattern, textual information ("1310 nm"), graphical information, etc.). In one example, if first color 725 indicates that a particular wavelength (e.g., 1310 nm) is received by first male connector 715, a technician may know to install a transceiver with the particular wavelength (e.g., 1310 nm) in a piece of equipment that is to receive the network conduit.

Second color 730 may be associated with second male connector 720, and may provide an indication of a wavelength received by second male connector 720 (e.g., a wavelength that is different than the wavelength received by first male connector 715). For example, second color 730 may be red (or some other color different than first color 725) and may indicate that a "1550" nm wavelength is received by second male connector 720 (e.g., when second male connector 720 is coupled to an optical power meter and the optical power meter reads an optical power). In other implementations, second color 730 may be replaced with other types of indicators (e.g., a graphic pattern, textual information ("1550 nm"), graphical information, etc.). In one example, if second color 730 indicates that a particular wavelength (e.g., 1550 nm) is received by second male connector 720, a technician may know to install a transceiver with the particular wavelength (e.g., 1550 nm) in a piece of equipment that is to receive the network conduit.

Each collimator lens 735 may include a curved mirror or lens that narrows a beam of particles or waves (e.g., optical signals). Each collimator lens 735 may cause a direction of motion of an optical signal to become more aligned in a specific direction (i.e., collimated or parallel) or may cause a spatial cross section of the optical signal to become smaller. For example, the top left collimator lens 735 may collimate an optical signal received from female connector 710, and may provide the collimated optical signal to wavelength splitter 740. The top right collimator lens 735 may collimate an optical signal received from wavelength splitter 740, and may provide the collimated optical signal to first male connector 715. The bottom collimator lens 735 may collimate an optical signal received from wavelength splitter 740, and may provide the collimated optical signal to second male connector 720.

Wavelength splitter 740 may include an optical device that permits optical signals provided at one particular wavelength to pass through wavelength splitter 740, and that reflects optical signals provided at another particular wavelength. For example, as shown in FIG. 7, device 700 may receive (e.g., via female connector 710) a first wavelength optical signal 745 (e.g., a 1310 nm optical signal) and a second wavelength optical signal 750 (e.g., a 1550 nm optical signal). In one implementation, optical signals 745/750 may be provided by a network conduit (e.g., a SFBDC fiber, not shown) to female connector 710, and may be received by wavelength splitter 740. Wavelength splitter 740 may permit first wavelength optical signal 745 to pass through wavelength splitter 740 and to be provided to first male connector 715. Wavelength splitter 740 may reflect second wavelength optical signal 750, and may enable second wavelength optical signal 750 to be provided to second male connector 720.

In one example implementation, if first wavelength optical signal 745 is received by first male connector 715, a technician may know to install a transceiver with the particular wavelength (e.g., 1310 nm) in a piece of equipment that is to receive the network conduit. In another example implementation, if second wavelength optical signal 750 is received by second male connector 720, a technician may know to install a transceiver with the particular wavelength (e.g., 1550 nm) in a piece of equipment that is to receive the network conduit.

Although FIG. 7 shows example components of device 700, in other implementations, device 700 may include fewer components, different components, differently arranged components, and/or additional components than those depicted in FIG. 7. Alternatively, or additionally, one or more components of device 700 may perform one or more other tasks described as being performed by one or more other components of device 700. For example, a female connector of device 700 may be replaced with a male connector, and a male connector of device 700 may be replaced with a female connector.

Figure 8A:
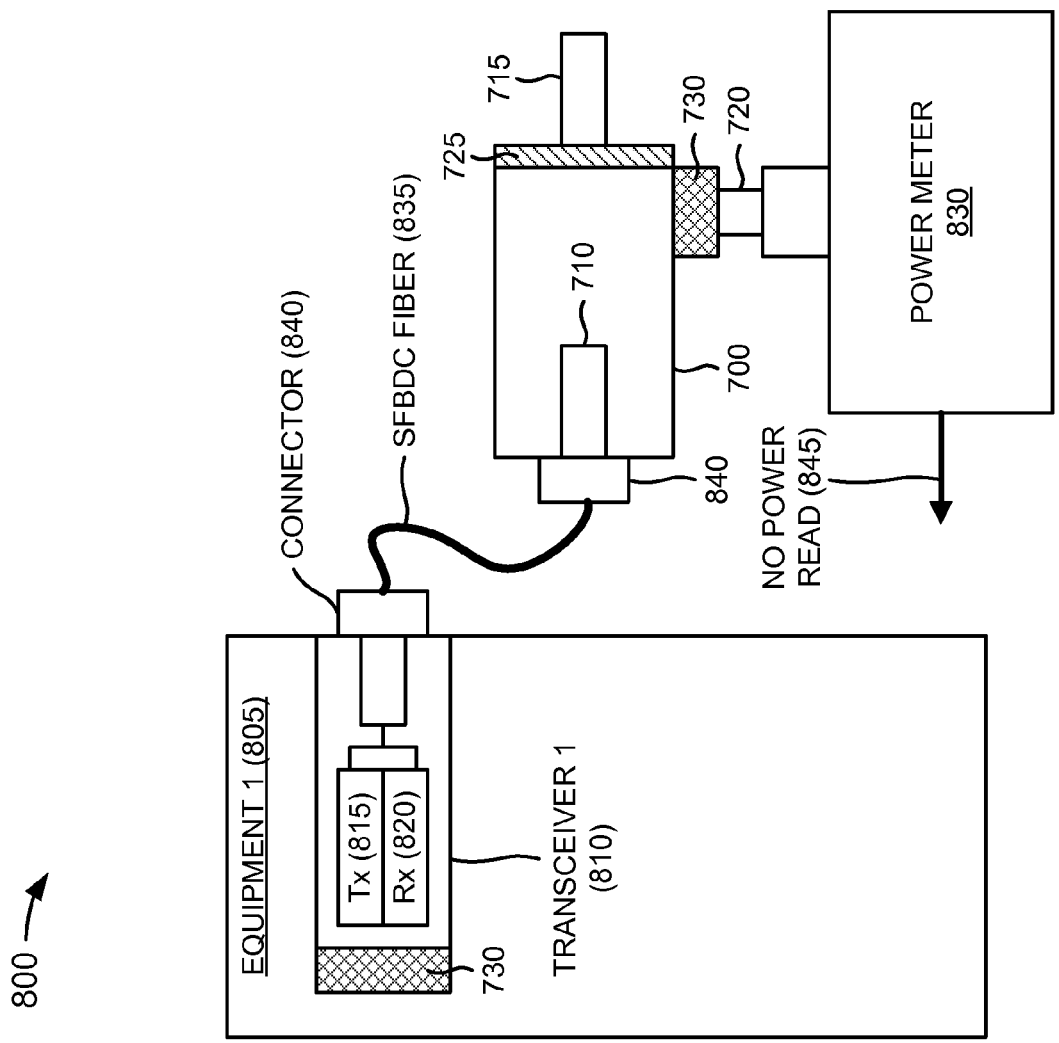
Figure 8B:
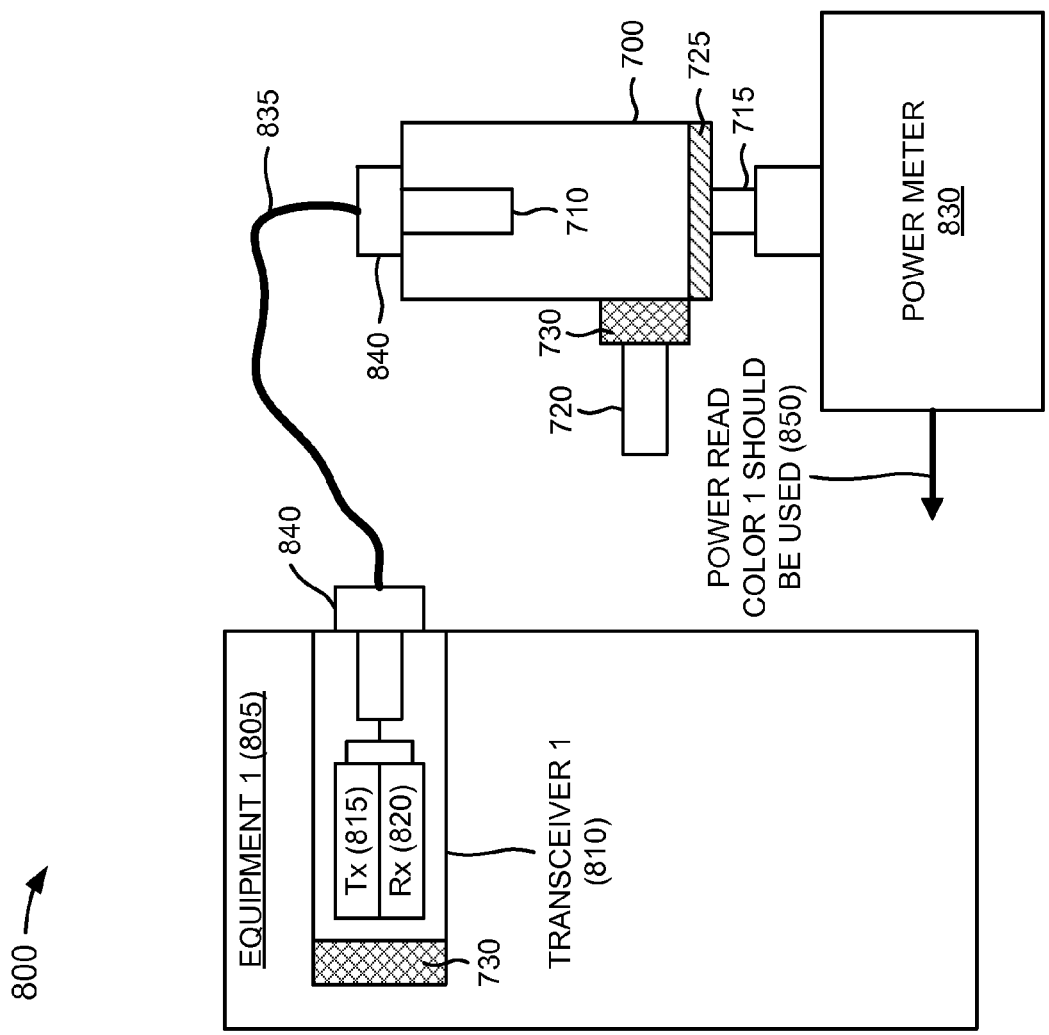

FIGS. 8A-8C are diagrams 800 of example optical signal measurements capable of being provided by device 700. As shown in FIG. 8A, a first piece of equipment 805 (e.g., a network device, such as a gateway, a router, a switch, a firewall, a network interface card (NIC), a hub, a bridge, a proxy server, an optical add-drop multiplexer (OADM), etc.) may include a first transceiver 810. In one example, first transceiver 810 may correspond to a SFP transceiver that includes a transmitter (Tx) 815 and a receiver (Rx) 820. As further shown in FIG. 8A, first transceiver 810 may be associated with second color 730 and thus transmitter 815 may transmit optical signals at a particular wavelength (e.g., 1550 nm) associated with second color 730.

In one example, first equipment 805 may need to connect to a second piece of equipment 825 (e.g., a network device, such as a gateway, a router, a switch, a firewall, a NIC, a hub, a bridge, a proxy server, an OADM, etc.) via a network conduit (e.g., a SFBDC fiber). Thus, a technician may need to determine which type of transceiver to provide in second equipment 825. In order to make this determination, the technician may utilize a conventional optical power meter 830 and a SFBDC fiber 835 that includes two male network connectors 840. SFBDC 835 may provide bi-directional communications among first equipment 805 and second equipment 825.

As further shown in FIG. 8A, the technician may connect one male network connector 840 to first transceiver 810 and may connect the other male network connector 840 to female connector 710 of device 700. The technician may connect one of the male connectors (e.g., first male connector 715 or second male connector 720) of device 700 to power meter

830. As shown in FIG. 8A, the technician may connect second male connector 720 to power meter 830 and may determine if an optical power is detected by power meter 830. If no optical power is detected by power meter 830, as indicated by reference number 845, the technician may determine that a transceiver (e.g., that transmits optical signals at a particular wavelength (1550 nm) associated with second color 730) may not be provided in second equipment 825. The technician may then connect first male connector 715 to power meter 830, as shown in FIG. 8B.

With reference to FIG. 8B, after connecting first male connector 715 to power meter 830, the technician may once again determine if an optical power is detected by power meter 830. If optical power is detected by power meter 830, as indicated by reference number 850, the technician may determine that a transceiver (e.g., that transmits optical signals at a particular wavelength (1310 nm) associated with first color 725) should be provided in second equipment 825. Based on this determination, the technician may install a second transceiver 855 into second equipment 825. In one example, second transceiver 855 may correspond to a SFP transceiver that includes a transmitter (Tx) 860 and a receiver (Rx) 865. As further shown in FIG. 8B, second transceiver 855 may be associated with first color 725 and thus transmitter 860 may transmit optical signals at a particular wavelength (e.g., 1310 nm) associated with first color 725.

After second transceiver 855 is installed in second equipment 825, the technician may remove device 700 from power meter 830, and may remove the other male network connector 840 from female connector 710 of device 700, as shown in FIG. 8C. As further shown in FIG. 8C, the technician may connect the other male network connector 840 to second transceiver 855. After this connection, SFBDC fiber 835 may enable bi-directional communications between first transceiver 810 (e.g., first equipment 805) and second transceiver 855 (e.g., second equipment 825).

In one example implementation, if power meter 830 does not detect optical power when male connectors 715 and 720 are connected to power meter 830, the technician may determine that any transceiver (e.g., SFP) can be provided in second equipment 825. Alternatively, the technician may determine that there is a problem with first transceiver 810, SFBDC fiber 835, and/or connectors 840.

Figure 9A:
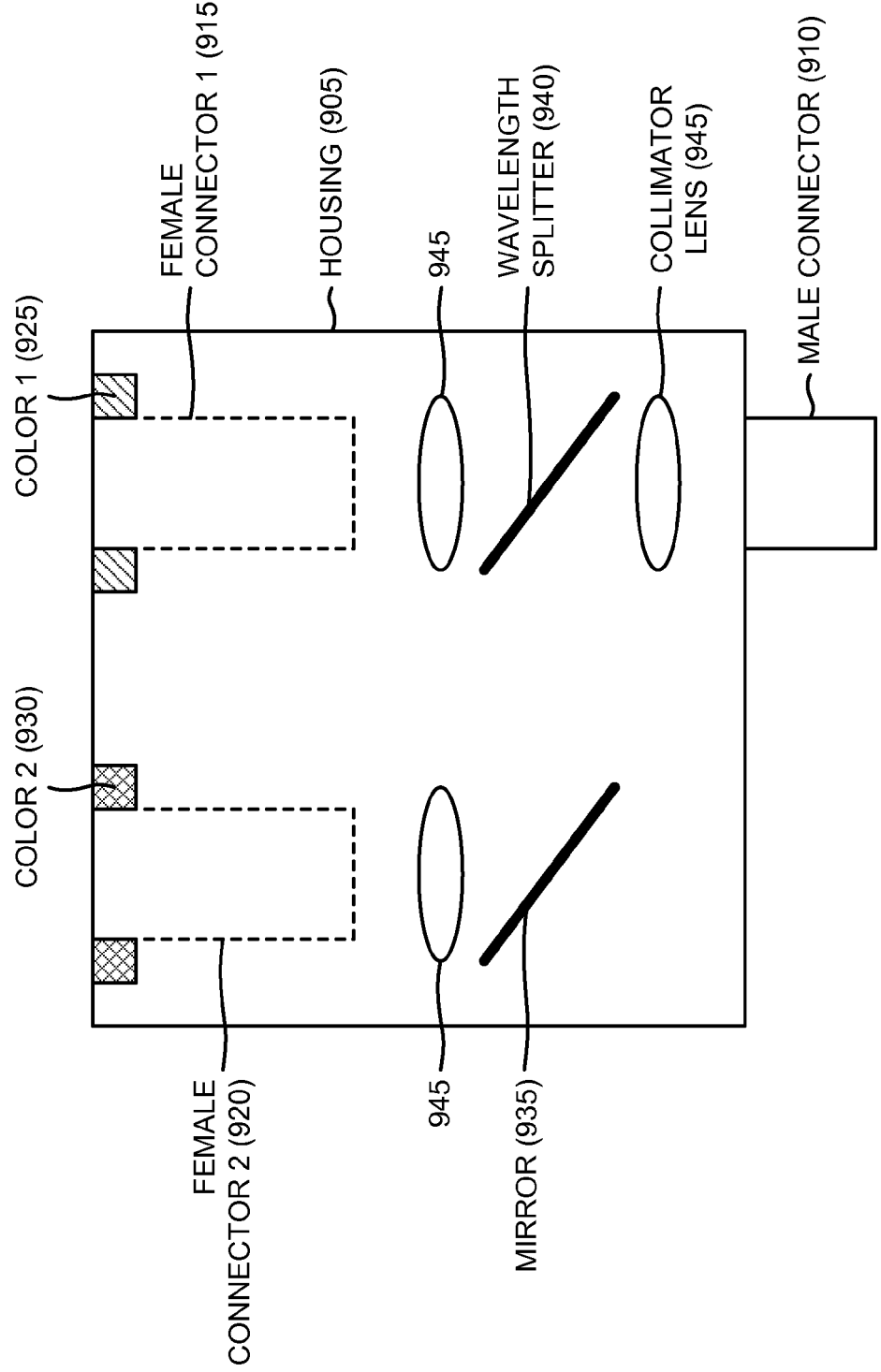

FIGS. 9A-9C are diagrams of another example device 900 that enables wavelengths to be easily distinguished by systems and/or methods described herein. Device 900 may include any device used to determine wavelengths of a conduit. For example, in one implementation, device 900 may be utilized with an optical power meter that measures a strength or power of an optical signal provided through a conduit. Based on the measurements obtained by the optical power meter, device 900 may enable wavelengths of the conduit to be determined. The wavelengths of the conduit may be used to determine which type of transceiver to install in a piece of equipment (e.g., a network device).

As shown in FIG. 9A, device 900 may include a variety of components, such as a housing 905, a male connector 910, a first female connector 915, a second female connector 920, a first color 925 associated with first female connector 915, a second color 930 associated with second female connector 920, a mirror 935, a wavelength splitter 940, and three collimator lenses 945.

Housing 905 may protect the components of device 900 from outside elements. Housing 905 may be made from a variety of materials (e.g., metal, plastic, etc.) and may be sized to accommodate other components of device 900.

Male connector 910 may be communicatively connected with components within housing 905 and may extend away from housing 905. Male connector 910 may optically communicate with first female connector 915 via wavelength splitter 940 and the right two collimator lenses 945, and may optically communicate with second female connector 920 via mirror 935, wavelength splitter 940, the left collimator lens 945, and the bottom collimator lens 945. Male connector 910 may permit wavelength measurement, by device 900, of an optical signal provided to or by female connectors 915 or 920. Male connector 910 may include a variety of male connectors. For example, male connector 910 may include a male optical fiber connector (e.g., LC, FC, ST, SC, biconic, ESCON, FICON, FDDI, loopback, Opti-Jack, MT-RJ, D4, MTP, MU, SMA, etc. type connectors), a male electrical connector (e.g., a coaxial cable connector), etc.

First female connector 915 may be provided in housing 905. First female connector 915 may be a point of attachment for a network conduit (e.g., connected to a piece of equipment, not shown) and may be a point of entry for a male network connector (not shown) provided at one end of the network conduit. First female connector 915 may receive a variety of male network connectors. For example, first female connector 915 may receive a male optical fiber connector (e.g., LC, FC, ST, SC, biconic, ESCON, FICON, FDDI, loopback, Opti-Jack, MT-RJ, D4, MTP, MU, SMA, etc. type connectors), a male electrical connector (e.g., a coaxial cable connector), etc. First female connector 915 may permit wavelength measurement, by device 900, of an optical signal provided to or by the network conduit.

Second female connector 920 may be provided in housing 905. Second female connector 920 may be a point of attachment for a network conduit (e.g., connected to a piece of equipment, not shown) and may be a point of entry for a male network connector (not shown) provided at one end of the network conduit. Second female connector 920 may receive a variety of male network connectors. For example, second female connector 920 may receive a male optical fiber connector (e.g., LC, FC, ST, SC, biconic, ESCON, FICON, FDDI, loopback, Opti-Jack, MT-RJ, D4, MTP, MU, SMA, etc. type connectors), a male electrical connector (e.g., a coaxial cable connector), etc. Second female connector 920 may permit wavelength measurement, by device 900, of an optical signal provided to or by the network conduit.

First color 925 may be associated with first female connector 915, and may provide an indication of a wavelength received by first female connector 915. For example, first color 925 may be blue (or some other color) and may indicate that a "1310" nm wavelength is received by first female connector 915 (e.g., when male connector 910 is coupled to an optical power meter and the optical power meter reads an optical power). In other implementations, first color 925 may be replaced with other types of indicators (e.g., a graphic pattern, textual information ("1310 nm"), graphical information, etc.). In one example, if first color 925 indicates that a particular wavelength (e.g., 1310 nm) is received by first female connector 915, a technician may know to install a transceiver with the particular wavelength (e.g., 1310 nm) in a piece of equipment that is to receive the network conduit.

Second color 930 may be associated with second female connector 920, and may provide an indication of a wavelength received by second female connector 920 (e.g., a wavelength that is different than the wavelength received by first female connector 915). For example, second color 930 may be red (or some other color different than first color 925) and may indicate that a "1550" nm wavelength is received by second female connector 920 (e.g., when male connector 910 is coupled to an optical power meter and the optical power meter reads an optical power). In other implementations, second color 930 may be replaced with other types of indicators (e.g., a graphic pattern, textual information ("1550 nm"), graphical information, etc.). In one example, if second color 930 indicates that a particular wavelength (e.g., 1550 nm) is received by second female connector 920, a technician may know to install a transceiver with the particular wavelength (e.g., 1550 nm) in a piece of equipment that is to receive the network conduit.

Mirror 935 may include an object with at least one reflective surface. In one example implementation, mirror 935 may receive optical signals from second female connector 920 (e.g., via the left collimator lens 945), and may reflect the optical signals towards wavelength splitter 940.

Wavelength splitter 940 may include an optical device that permits optical signals provided at one particular wavelength to pass through wavelength splitter 940, and that reflects optical signals provided at another particular wavelength.

Each collimator lens 945 may include a curved mirror or lens that narrows a beam of particles or waves (e.g., optical signals). Each collimator lens 945 may cause a direction of motion of an optical signal to become more aligned in a specific direction (i.e., collimated or parallel) or may cause a spatial cross section of the optical signal to become smaller. For example, the top right collimator lens 945 may collimate an optical signal received from first female connector 915, and may provide the collimated optical signal to wavelength splitter 940. The bottom collimator lens 945 may collimate an optical signal received from wavelength splitter 940, and may provide the collimated optical signal to male connector 910. The top left collimator lens 945 may collimate an optical signal received from second female connector 920, and may provide the collimated optical signal to mirror 935.

FIGS. 9B and 9C may depict operation of device 900 during receipt of optical signals. For example, as shown in FIG. 9B, device 900 may receive (e.g., via female connectors 915 and 920) a first wavelength optical signal 950 (e.g., a 1310 nm optical signal). In one implementation, first wavelength optical signal 950 may be provided by a network conduit (e.g., a SFBDC fiber, not shown) to first female connector 915, and may be received by wavelength splitter 940. Wavelength splitter 940 may permit first wavelength optical signal 950 to pass through wavelength splitter 940 and to be provided to male connector 910. In another implementation, first wavelength optical signal 950 may be provided by a network conduit (e.g., a SFBDC fiber, not shown) to second female connector 920, and may be reflected by mirror 935 towards wavelength splitter 940. Wavelength splitter 940 may permit first wavelength optical signal 950 to pass through wavelength splitter 940 and to be absorbed or blocked by housing 905 of device 900.

In one example implementation, if first wavelength optical signal 950 (e.g., provided via first female connector 915) is received by male connector 910, a technician may know to install a transceiver with the particular wavelength (e.g., 1310 nm) in a piece of equipment that is to receive the network conduit. In another example implementation, if first wavelength optical signal 950 (e.g., provided via second female connector 920) is not received by male connector 910, a technician may know to install a transceiver with the particular wavelength (e.g., 1310 nm) in a piece of equipment that is to receive the network conduit.

As shown in FIG. 9C, device 900 may receive (e.g., via female connectors 915 and 920) a second wavelength optical signal 955 (e.g., a 1550 nm optical signal). In one implementation, second wavelength optical signal 955 may be provided by a network conduit (e.g., a SFBDC fiber, not shown) to first female connector 915, and may be reflected by wavelength splitter 940 toward housing 905 of device 900. Housing 905 may absorb or block second wavelength optical signal 955. In another implementation, second wavelength optical signal 955 may be provided by a network conduit (e.g., a SFBDC fiber, not shown) to second female connector 920, and may be reflected by mirror 935 towards wavelength splitter 940. Wavelength splitter 940 may reflect second wavelength optical signal 955 to male connector 910.

In one example implementation, if second wavelength optical signal 955 (e.g., provided via first female connector 915) is not received by male connector 910, a technician may know to install a transceiver with the particular wavelength (e.g., 1550 nm) in a piece of equipment that is to receive the network conduit. In another example implementation, if second wavelength optical signal 955 (e.g., provided via second female connector 920) is received by male connector 910, a technician may know to install a transceiver with the particular wavelength (e.g., 1550 nm) in a piece of equipment that is to receive the network conduit.

Although FIGS. 9A-9C show example components of device 900, in other implementations, device 900 may include fewer components, different components, differently arranged components, and/or additional components than those depicted in FIGS. 9A-9C. Alternatively, or additionally, one or more components of device 900 may perform one or more other tasks described as being performed by one or more other components of device 900. For example, a female connector of device 900 may be replaced with a male connector, and a male connector of device 900 may be replaced with a female connector.

Figure 10A:
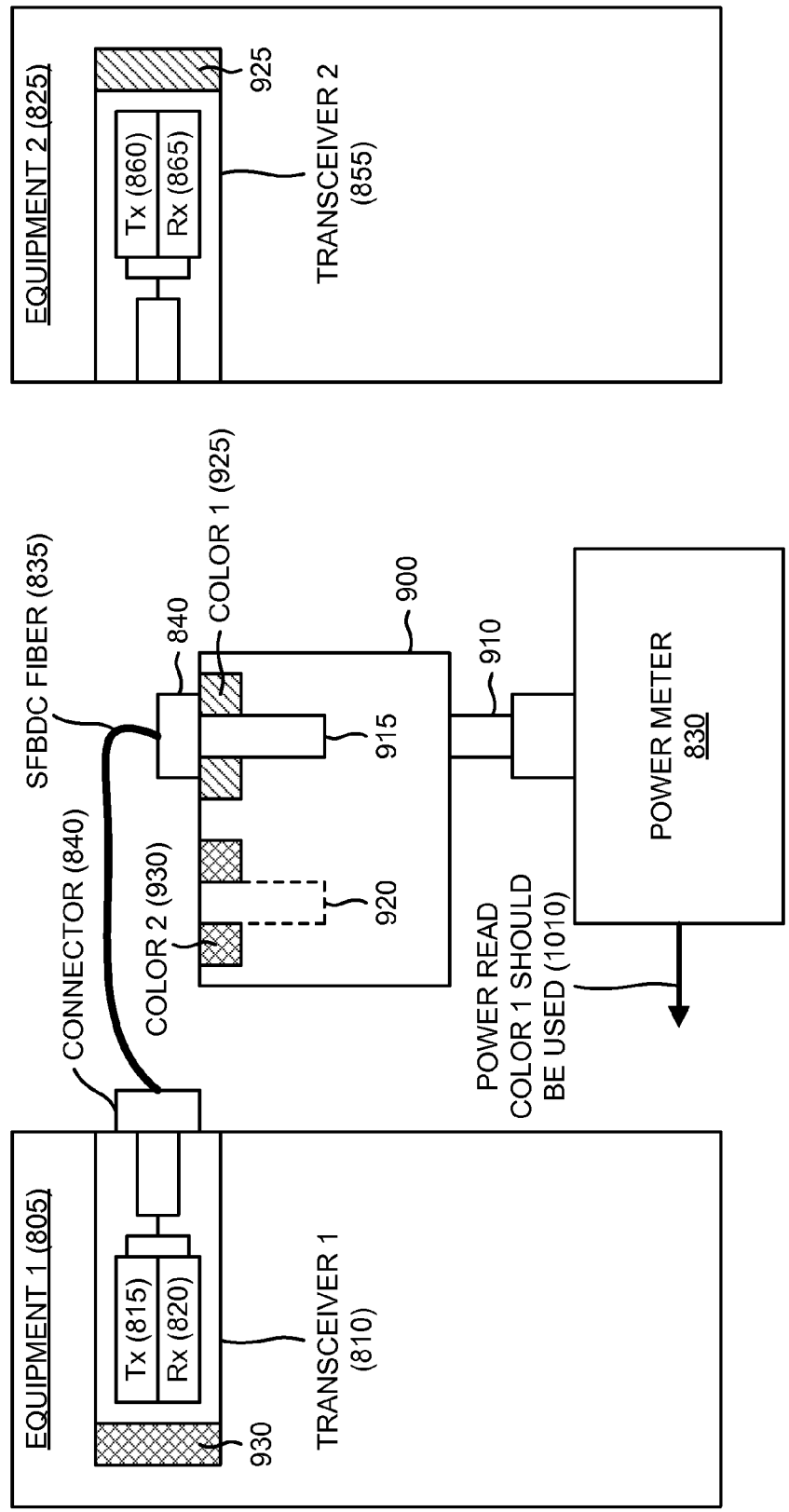
FIGS. 10A and 10B are diagrams of example optical signal measurements capable of being provided by the device shown in FIGS. 9A-9C.
Figure 10B:
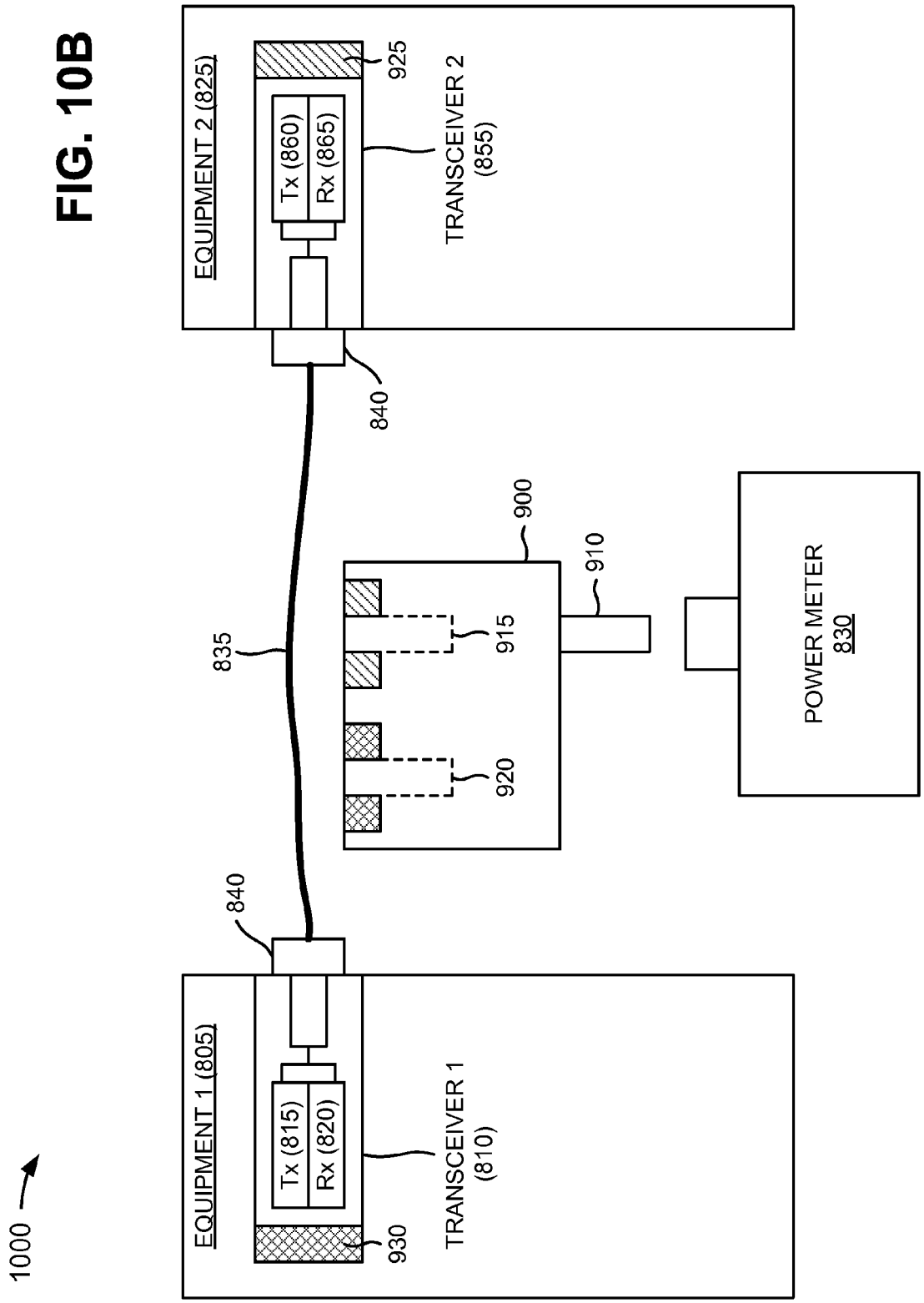

FIGS. 10A and 10B are diagrams 1000 of example optical signal measurements capable of being provided by device 900. As shown in FIG. 10A, first equipment 805 may include first transceiver 810, which may be associated with second color 930. Thus, transmitter 815 may transmit optical signals at a particular wavelength (e.g., 1550 nm) associated with second color 930. In one example, first equipment 805 may need to connect to second equipment 825, and a technician may need to determine which type of transceiver to provide in second equipment 825. In order to make this determination, the technician may utilize conventional optical power meter 830 and SFBDC fiber 835.

As further shown in FIG. 10A, the technician may connect one male network connector 840 to first transceiver 810 and may connect the other male network connector 840 to first female connector 915 of device 900. The technician may connect male connector 910 of device 900 to power meter 830, and may determine if an optical power is detected by power meter 830. If optical power is detected by power meter 830, as indicated by reference number 1010, the technician may determine that a transceiver (e.g., that transmits optical signals at a particular wavelength (1310 nm) associated with first color 925) should be provided in second equipment 825. Based on this determination, the technician may install second transceiver 855 into second equipment 825. In one example, second transceiver 855 may correspond to a SFP transceiver that includes transmitter (Tx) 860 and receiver (Rx) 865. As further shown in FIG. 10A, second transceiver 855 may be associated with first color 925 and thus transmitter 860 may transmit optical signals at a particular wavelength (e.g., 1310 nm) associated with first color 925.

After second transceiver 855 is installed in second equipment 825, the technician may remove device 900 from power meter 830, and may remove the other male network connector 840 from first female connector 915 of device 900, as shown in FIG. 10B. As further shown in FIG. 10B, the technician may connect the other male network connector 840 to second transceiver 855. After this connection, SFBDC fiber 835 may enable bi-directional communications between first transceiver 810 (e.g., first equipment 805) and second transceiver 855 (e.g., second equipment 825).

If power meter 830 did not detect optical power when the other male network connector 840 was connected to first female connector 915 of device 900, the technician may connect the other male network connector 840 to second female connector 920 of device 900. If optical power is detected by power meter 830 at this time, the technician may determine that a transceiver (e.g., that transmits optical signals at a particular wavelength (1550 nm) associated with second color 930) should be provided in second equipment 825.

In one example implementation, if power meter 830 does not detect optical power when the other male network connector 840 is connected to female connectors 915/920, the technician may determine that any transceiver (e.g., SFP) can be provided in second equipment 825. Alternatively, the technician may determine that there is a problem with first transceiver 810, SFBDC fiber 835, and/or connectors 840.

FIG. 11 is a flow chart of an example process 1100 for identifying which transceiver to use for an optical fiber according to implementations described herein. In one implementation, process 1100 may be performed with device 700. In another implementation, some or all of process 1100 may be performed with another device or group of devices, including or excluding device 700.

As illustrated in FIG. 11, process 1100 may include providing a transceiver in a first piece of equipment (block 1110), connecting one end of an optical fiber to the transceiver in the first piece of equipment (block 1120), and connecting the other end of the optical fiber to a female connector of a device (block 1130). For example, in implementations described above in connection with FIG. 8A, first equipment 805 may include first transceiver 810 that includes transmitter (Tx) 815 and receiver (Rx) 820. In one example, first equipment 805 may need to connect to second equipment 825 via a network conduit (e.g., SFBDC fiber 835). Thus, a technician may need to determine which type of transceiver to provide in second equipment 825. In order to make this determination, the technician may utilize SFBDC fiber 835. The technician may connect one male network connector 840 of SFBDC fiber 835 to first transceiver 810 and may connect the other male network connector 840 of SFBDC fiber 835 to female connector 710 of device 700.

As further shown in FIG. 11, process 1100 may include plugging a first male connector of the device into a power meter (block 1140), and determining whether power is detected by the power meter (block 1150). If power is detected by the power meter (block 1150—YES), process 1100 may include providing a transceiver in a second piece of equipment that matches the wavelength received by the first male connector of the device (block 1160). For example, in implementations described above in connection with FIG. 8B, the technician may connect first male connector 715 to power meter 830. After connecting first male connector 715 to power meter 830, the technician may determine if an optical power is detected by power meter 830. If optical power is detected by power meter 830, as indicated by reference number 850, the technician may determine that a transceiver (e.g., that transmits optical signals at a particular wavelength (1310 nm) associated with first color 725) should be provided in second equipment 825. Based on this determination, the technician may install second transceiver 855 into second equipment 825. In one example, second transceiver 855 may correspond to a SFP transceiver that includes transmitter (Tx) 860 and receiver (Rx) 865. Transmitter 860 may transmit optical signals at a particular wavelength (e.g., 1310 nm) associated with first color 725.

Returning to FIG. 11, if power is not detected by the power meter (block 1150—NO), process 1100 may include plugging a second male connector of the device into the power meter (block 1170), and determining whether power is detected by the power meter (block 1180). If power is detected by the power meter (block 1180—YES), process 1100 may include providing a transceiver in the second piece of equipment that matches the wavelength received by the second male connector of the device (block 1190). For example, in implementations described above in connection with FIGS. 8A and 8B, if no optical power is detected by power meter 830, as indicated by reference number 845, the technician may determine that a transceiver (e.g., that transmits optical signals at a particular wavelength (1550 nm) associated with second color 730) may not be provided in second equipment 825. The technician may then connect first male connector 715 to power meter 830. If optical power is detected by power meter 830, as indicated by reference number 850, the technician may determine that a transceiver (e.g., that transmits optical signals at a particular wavelength (1310 nm) associated with first color 725) should be provided in second equipment 825. Based on this determination, the technician may install second transceiver 855 into second equipment 825.

If power is not detected by the power meter (block 1180—NO), process 1100 may end. For example, in implementations described above in connection with FIG. 8C, if power meter 830 does not detect optical power when male connectors 715 and 720 are connected to power meter 830, the technician may determine that any transceiver (e.g., SFP) can be provided in second equipment 825. Alternatively, the technician may determine that there is a problem with first transceiver 810, SFBDC fiber 835, and/or connectors 840.

FIG. 12 is a flow chart of another example process 1200 for identifying which transceiver to use for an optical fiber according to implementations described herein. In one implementation, process 1200 may be performed with device 900. In another implementation, some or all of process 1200 may be performed with another device or group of devices, including or excluding device 900.

As illustrated in FIG. 12, process 1200 may include providing a transceiver in a first piece of equipment (block 1210), connecting one end of an optical fiber to the transceiver in the first piece of equipment (block 1220), and plugging a male connector of a device into a power meter (block 1230). For example, in implementations described above in connection with FIG. 10A, first equipment 805 may include first transceiver 810, which may be associated with second color 930. Thus, transmitter 815 of first transceiver 810 may transmit optical signals at a particular wavelength (e.g., 1550 nm) associated with second color 930. In one example, first equipment 805 may need to connect to second equipment 825, and a technician may need to determine which type of transceiver to provide in second equipment 825. In order to make this determination, the technician may utilize power meter 830 and SFBDC fiber 835. The technician may connect one male network connector 840 of SFBDC fiber 835 to first transceiver 810 and may connect male connector 910 of device 900 to power meter 830.

As further shown in FIG. 12, process 1200 may include connecting another end of the optical fiber to a first female connector of the device (block 1240), and determining whether power is detected by the power meter (block 1250).

If power is detected by the power meter (block 1250—YES), process 1200 may include providing a transceiver in a second piece of equipment that matches the wavelength received by the first female connector of the device (block 1260). For example, in implementations described above in connection with FIG. 10A, the technician may connect the other male network connector 840 of SFBDC fiber 835 to first female connector 915 of device 900. If optical power is detected by power meter 830, as indicated by reference number 1010, the technician may determine that a transceiver (e.g., that transmits optical signals at a particular wavelength (1310 nm) associated with first color 925) should be provided in second equipment 825. Based on this determination, the technician may install second transceiver 855 into second equipment 825. In one example, second transceiver 855 may correspond to a SFP transceiver that includes transmitter (Tx) 860 and receiver (Rx) 865. Transmitter 860 may transmit optical signals at a particular wavelength (e.g., 1310 nm) associated with first color 925.

Returning to FIG. 12, if power is not detected by the power meter (block 1250—NO), process 1200 may include connecting the other end of the optical fiber to a second female connector of the device (block 1270), and determining whether power is detected by the power meter (block 1280). If power is detected by the power meter (block 1280—YES), process 1200 may include providing a transceiver in the second piece of equipment that matches the wavelength received by the second female connector of the device (block 1290). For example, in implementations described above in connection with FIGS. 10A and 10B, if power meter 830 did not detect optical power when the other male network connector 840 was connected to first female connector 915 of device 900, the technician may connect the other male network connector 840 to second female connector 920 of device 900. If optical power is detected by power meter 830 at this time, the technician may determine that a transceiver (e.g., that transmits optical signals at a particular wavelength (1550 nm) associated with second color 930) should be provided in second equipment 825.

If power is not detected by the power meter (block 1280—NO), process 1200 may end. For example, in implementations described above in connection with FIG. 10B, if power meter 830 does not detect optical power when the other male network connector 840 is connected to female connectors 915/920, the technician may determine that any transceiver (e.g., SFP) can be provided in second equipment 825. Alternatively, the technician may determine that there is a problem with first transceiver 810, SFBDC fiber 835, and/or connectors 840.

Systems and/or methods described herein may provide an optical signal measurement device that enables wavelengths to be distinguished (e.g., via a measured power) and identifies which transceiver to use for an optical fiber. The optical signal measurement device may be inexpensive and small in size, and may be easily carried by a technician. The systems and/or methods may provide a color coding scheme that enables a technician to easily identify which transceiver to use for an optical fiber. The systems and/or methods may enable different types of transceivers (e.g., SFPs) to be used in the same network device, and may eliminate the need for an expensive power meter by technicians.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 11 and 12, the order of the blocks may be modified in other implementations. Further, non-dependent blocks may be performed in parallel. In other implementations, the receiver heads exposed outside the housings of devices described herein may be provided with covers or caps to keep them clean if not in use. In still other implementations, the devices described herein may include a variety of connector interfaces that may communicate with a variety of connector types (e.g., LC, FC, ST, SC, biconic, ESCON, FICON, FDDI, loopback, Opti-Jack, MT-RJ, D4, MTP, MU, SMA, etc. type connectors).

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or as "logic" that performs one or more functions. This component or logic may include hardware, such as an ASIC or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
   a female connector to receive a male network connector of a network conduit,
   the device enabling selection of a particular type of transceiver for receiving the male network connector of the network conduit, when the device is utilized with an optical power meter;
   a first male connector optically communicating with the female connector, the first male connector being associated with a first indicator that identifies a first wavelength optical signal;
   a second male connector optically communicating with the female connector, the second male connector being associated with a second indicator that identifies a second wavelength optical signal that is different than the first wavelength optical signal, the second indicator being different than the first indicator; and
   a wavelength splitter to:
      receive an optical signal from the network conduit via the female connector,
      provide the optical signal to the first male connector when the optical signal corresponds to the first wavelength optical signal, a transceiver of a first type being selected when the optical signal corresponds to the first wavelength optical signal and when the device is utilized with the optical power meter, and provide the optical signal to the second male connector when the optical signal corresponds to the second wavelength optical signal, a transceiver of a second type being selected when the optical signal corresponds to the second wavelength optical signal and when the device is utilized with the optical power meter.

2. The device of claim 1, further comprising:
a first collimator lens, provided between the female connector and the wavelength splitter, to provide the optical signal from the female connector to the wavelength splitter;
a second collimator lens, provided between the wavelength splitter and the first male connector, to provide the optical signal from the wavelength splitter to the first male connector; and
a third collimator lens, provided between the wavelength splitter and the second male connector, to provide the optical signal from the wavelength splitter to the second male connector.

3. The device of claim 1, where the first indicator is associated with a first color and the second indicator is associated with a second color different than the first color.

4. The device of claim 1, where the first indicator is associated with a first graphic pattern and the second indicator is associated with a second graphic pattern different than the first graphic pattern.

5. The device of claim 1, where the transceiver of the first type or the transceiver of the second type includes a small form-factor pluggable (SFP) transceiver.

6. The device of claim 1, where the device comprises an optical signal measurement device.

7. The device of claim 1, where the female connector is to receive at least one of:
a Local Connector (LC) male network connector;
a Ferrule Connector (FC) male network connector;
a Straight Tip (ST) male network connector;
a Standard Connector (SC) male network connector;
a biconic male network connector;
an Enterprise Systems Connection (ESCON) male network connector;
a Fiber Connectivity (FICON) male network connector;
a Fiber-Distributed Data Interface (FDDI) male network connector;
a loopback male network connector;
an Opti-Jack male network connector;
a Mechanical Transfer Registered Jack (MT-RJ) male network connector;
a D4 male network connector;
a MTP male network connector;
a MU male network connector; or
a SMA male network connector.

8. The device of claim 1, where the first male connector and the second male connector are to selectively connect to the optical power meter, the optical power meter selectively reading a first optical power of the first wavelength optical signal when connected to the first male connector and a second optical power of the second wavelength optical signal when connected to the second male connector, and
where the device determines:
a wavelength, associated with the first wavelength optical signal, based on the first optical power of the first wavelength optical signal, and
a wavelength, associated with the second wavelength optical signal, based on the second optical power of the second wavelength optical signal.

9. The device of claim 1, where the network conduit includes a single fiber bi-directional communications (SF-BDC) conduit.

10. A system comprising:
a device that includes:
a first connector to receive a network connector of a network conduit,
a second connector optically communicating with the first connector, the second connector being associated with a first indicator that identifies a first wavelength optical signal associated with a first wavelength,
a third connector optically communicating with the first connector, the third connector being associated with a second indicator that identifies a second wavelength optical signal associated with a second wavelength,
the second wavelength being different than the first wavelength,
the second indicator being different than the first indicator, and
the first connector, the second connector, and the third connector differing from one another; and
a wavelength splitter to:
receive an optical signal from the network conduit via the first connector,
provide the optical signal to an optical power meter via the second connector when the optical signal corresponds to the first wavelength optical signal, and
provide the optical signal to the optical power meter via the third connector when the optical signal corresponds to the second wavelength optical signal,
the device enabling selection of a particular type of transceiver for receiving the network connector of the network conduit, when the device is utilized with the optical power meter,
a transceiver of a first type being selected based on the optical signal corresponding to the first wavelength optical signal, and
a transceiver of a second type being selected based on the optical signal corresponding to the second wavelength optical signal.

11. The system of claim 10, where the first indicator is associated with a first color, and
where the second indicator is associated with a second color different than the first color.

12. The system of claim 10, where the first indicator is associated with first textual information or first graphical information, and
where the second indicator is associated with second textual information or second graphical information.

13. The system of claim 10, where the device further includes:
a first collimator lens, provided between the wavelength splitter and the second connector, to provide the optical signal from the wavelength splitter to the second connector; and
a second collimator lens, provided between the wavelength splitter and the third connector, to provide the optical signal from the wavelength splitter to the third connector.

14. The system of claim 13, where the device further includes:

a third collimator lens, provided between the first connector and the wavelength splitter, to provide the optical signal from the first connector to the wavelength splitter.

15. The system of claim 10, where the second connector and the third connector are to selectively connect to the optical power meter, where the transceiver of the first type is selected when a first power, associated with the first wavelength optical signal, is detected when the optical power meter is connected to the second connector, and where the transceiver of the second type is selected when a second power, associated with the second wavelength optical signal, is detected when the optical power meter is connected to the third connector.

16. A device comprising:

a first connector to receive a connector of a network conduit;

a second connector communicating with the first connector, the second connector being associated with a first indicator that identifies a first signal associated with a first wavelength;

a third connector communicating with the first connector, the third connector being associated with a second indicator that identifies a second signal associated with a second wavelength that is different than the first wavelength, the second indicator being different than the first indicator, and the first connector, the second connector, and the third connector differing from one another; and a wavelength splitter to:

receive an optical signal from the network conduit via the first connector, provide the optical signal to the second connector when the optical signal corresponds to the first signal, and provide the optical signal to the second male connector when the optical signal corresponds to the second signal, the device enabling selection of a particular type of transceiver for receiving the connector of the network conduit, when the device is utilized with an optical power meter, a transceiver of a first type being selected based on the optical signal corresponding to the first signal, and a transceiver of a second type being selected based on the optical signal corresponding to the second signal.

17. The device of claim 16, where the first indicator is associated with a first color, and where the second indicator is associated with a second color different than the first color.

18. The device of claim 16, where the first indicator includes first textual information or first graphical information, and where the second indicator includes second textual information or second graphical information.

19. The device of claim 16, further comprising:

a first collimator lens, provided between the wavelength splitter and the first connector, to provide the optical signal from the first connector to the wavelength splitter;

a second collimator lens, provided between the wavelength splitter and the second connector, to provide the optical signal from the wavelength splitter to the second connector; and a third collimator lens, provided between the wavelength splitter and the third connector, to provide the optical signal from the wavelength splitter to the third connector.

20. The device of claim 16, where the second connector and the third connector are to selectively connect to the optical power meter, where the transceiver of the first type is selected when a first power, associated with the first signal, is detected when the optical power meter is connected to the second connector, and where the transceiver of the second type is selected when a second power, associated with the second signal, is detected when the optical power meter is connected to the third connector.

* * * * *